United States Patent
Hendrickson et al.

(10) Patent No.: US 6,256,337 B1
(45) Date of Patent: *Jul. 3, 2001

(54) RAPID ACQUISITION OF PN SYNCHRONIZATION IN A DIRECT-SEQUENCE SPREAD-SPECTRUM DIGITAL COMMUNICATIONS SYSTEM

(75) Inventors: Alan F. Hendrickson; Ken M. Tallo, both of Austin, TX (US)

(73) Assignee: DSP Group, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/148,607

(22) Filed: Sep. 4, 1998

Related U.S. Application Data

(63) Continuation-in-part of application No. 08/976,175, filed on Nov. 21, 1997.
(60) Provisional application No. 60/031,350, filed on Nov. 21, 1996.

(51) Int. Cl.$^7$ ...................................................... H04L 27/30
(52) U.S. Cl. ......................... 375/140; 375/367; 375/341; 375/343
(58) Field of Search ............................ 325/479; 375/200, 375/1, 206, 140, 367, 343, 341

(56) References Cited

U.S. PATENT DOCUMENTS

| | | | |
|---|---|---|---|
| 3,706,933 | * 12/1972 | Bidell et al. | 325/479 |
| 4,279,018 | 7/1981 | Carson . | |
| 5,361,276 | * 11/1994 | Subramanian | 375/1 |
| 5,440,597 | * 8/1995 | Chung et al. | 375/200 |
| 5,642,377 | * 6/1997 | Chung et al. | 375/200 |
| 5,689,525 | * 11/1997 | Takeishi et al. | 375/206 |
| 5,696,766 | 12/1997 | Yeung et al. . | |
| 5,745,496 | 4/1998 | Lysejko . | |
| 6,002,709 | * 12/1999 | Hendrickson | 375/206 |
| 6,002,710 | * 12/1999 | Hendrickson et al. | 375/206 |

FOREIGN PATENT DOCUMENTS

WO93/15573  8/1993  (GB) .

OTHER PUBLICATIONS

Sanguoon Chung, A New Serial Acquisition Approach With Automatic Decision Threshold Control, 1995 IEEE, pp. 530–536.*

Alfred W. Fuxjaeger, and Ronald A. Iitis, Acquisition of Timing and Doppler–shift in a Direct–Sequence Spread––Spectrum System, 1994 IEEE, pp. 2870–2880.*

* cited by examiner

*Primary Examiner*—Stephen Chin
*Assistant Examiner*—Tony Al-Beshrawai
(74) *Attorney, Agent, or Firm*—Conley, Rose & Tayon PC; Jeffrey C. Hood

(57) ABSTRACT

In a direct sequence spread spectrum communication system, a system and method for recovering the timing of a pseudo-random noise (PN) sequence used for despreading the received signals. In one embodiment, the communication system is a time-division duplexing (TDD) or a time-division multiple-access (TDMA) system. A receiver in the communication system uses a "sliding correlator" maximal-likelihood (ML) detection system to scan through a range of possible PN phases to determine the correct one. In one embodiment of a method for performing the synchronization, a receiver acquires the PN phase by repeating the ML detection for a time greater than or equal to the period of the TDD or TDMA frames, with a sufficiently high repetition rate to ensure that the correct PN phase is examined at least once during a received frame. The acquisition is thereby completed within a fixed amount of time. One embodiment of a system for performing the synchronization includes an input for the received signal, a receiver PN clock, and an ML detection logic. The ML detection logic repeats the ML detection so that at least one complete set of PN phases is examined during a time when the received signal is active. In another embodiment of the method, the receiver acquires the PN phase by performing the ML detection during a timeslot in which a received frame is expected. Again, the acquisition is completed within a fixed amount of time.

24 Claims, 20 Drawing Sheets

Acquisition flowchart.

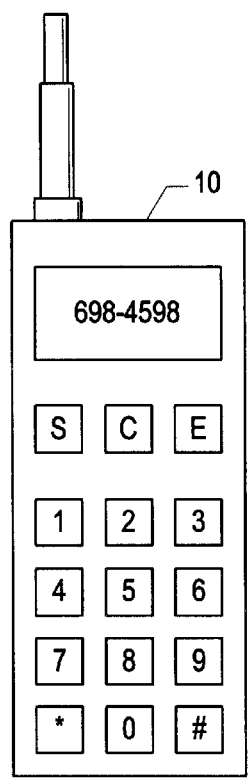
Fig. 1a: DQPSK Spread-spectrum transceiver.
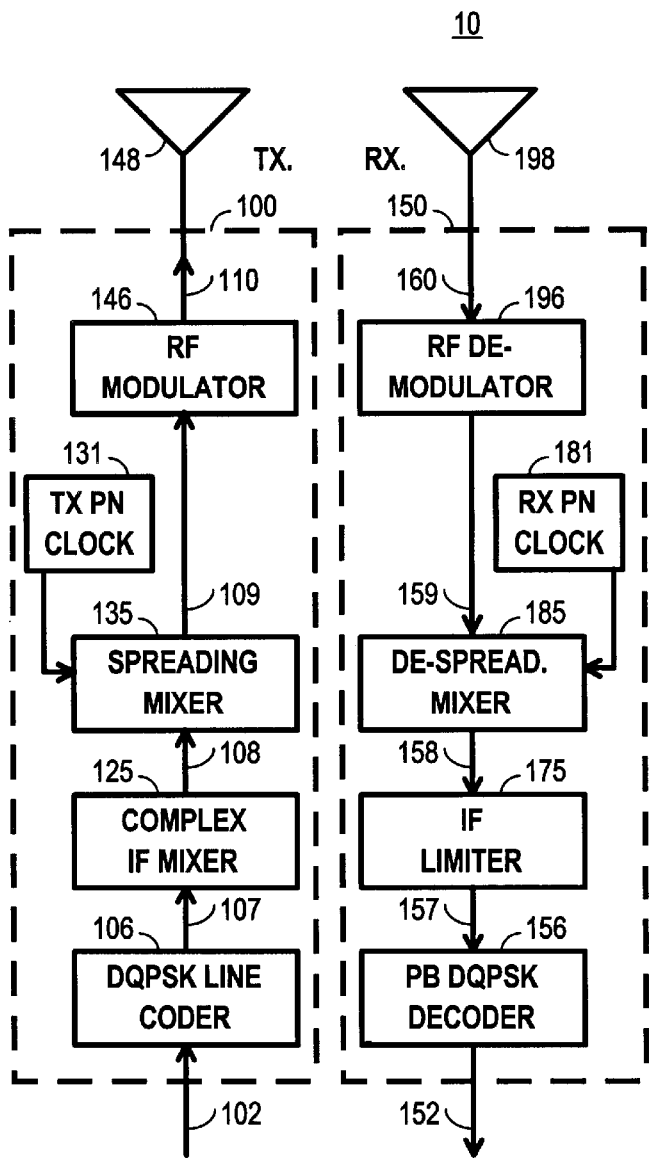
Fig. 1b: DQPSK Spread-spectrum transceiver.

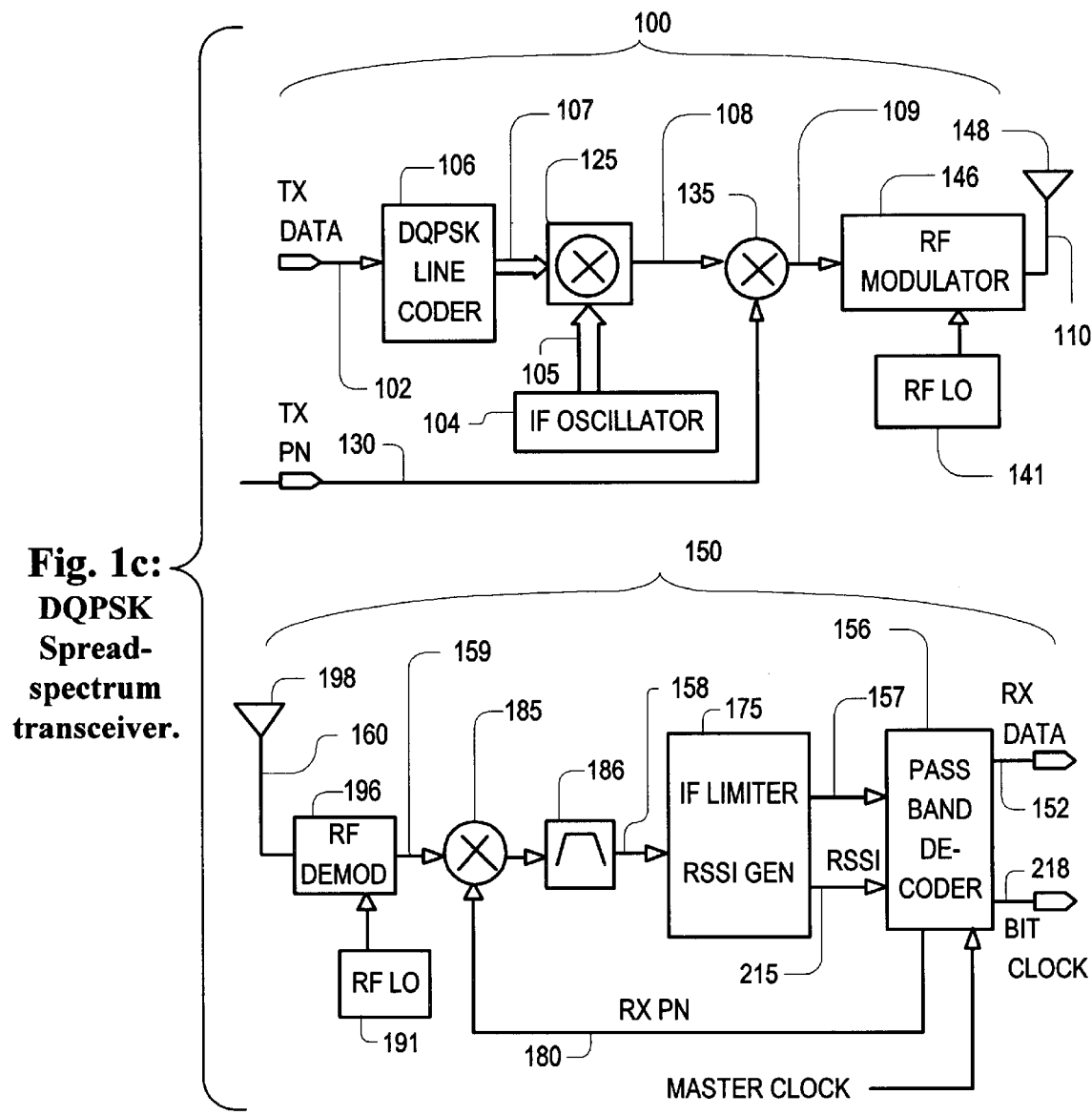
Fig. 1c: DQPSK Spread-spectrum transceiver.

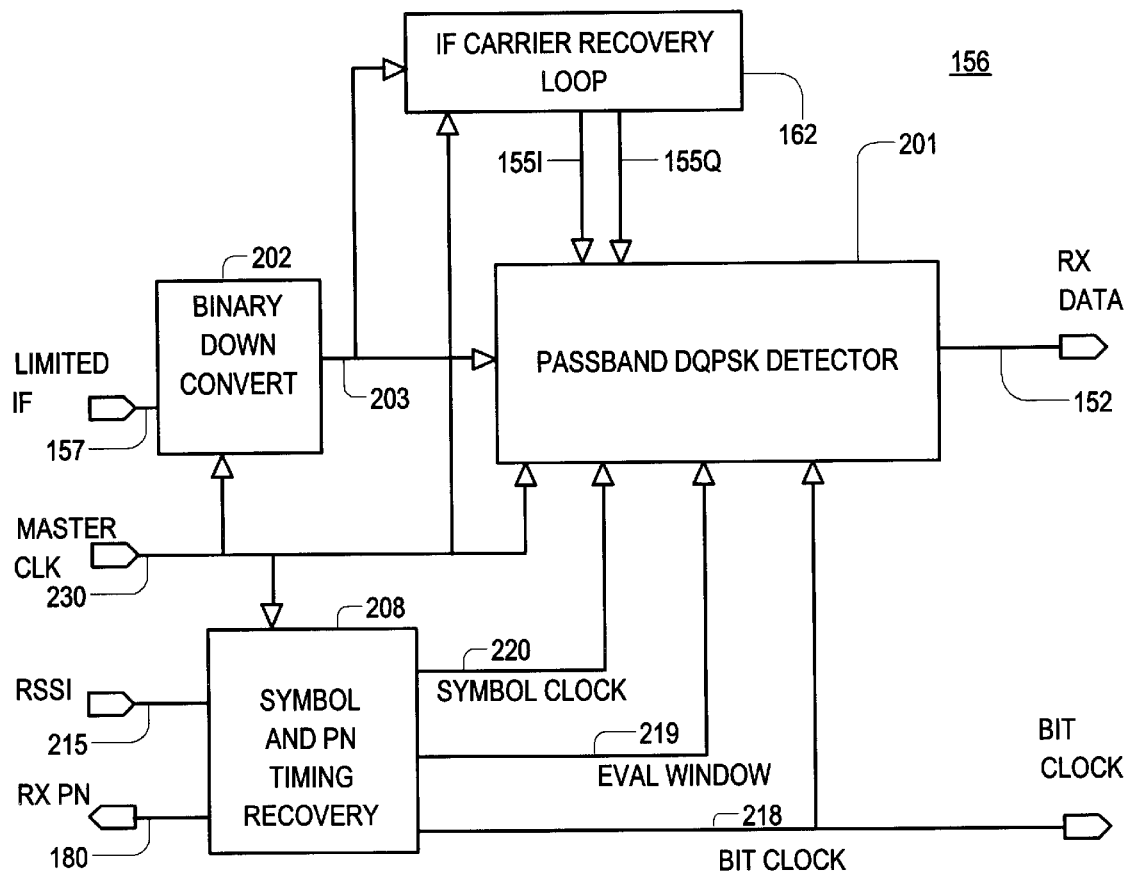
Fig. 2: Passband DQPSK decoder.

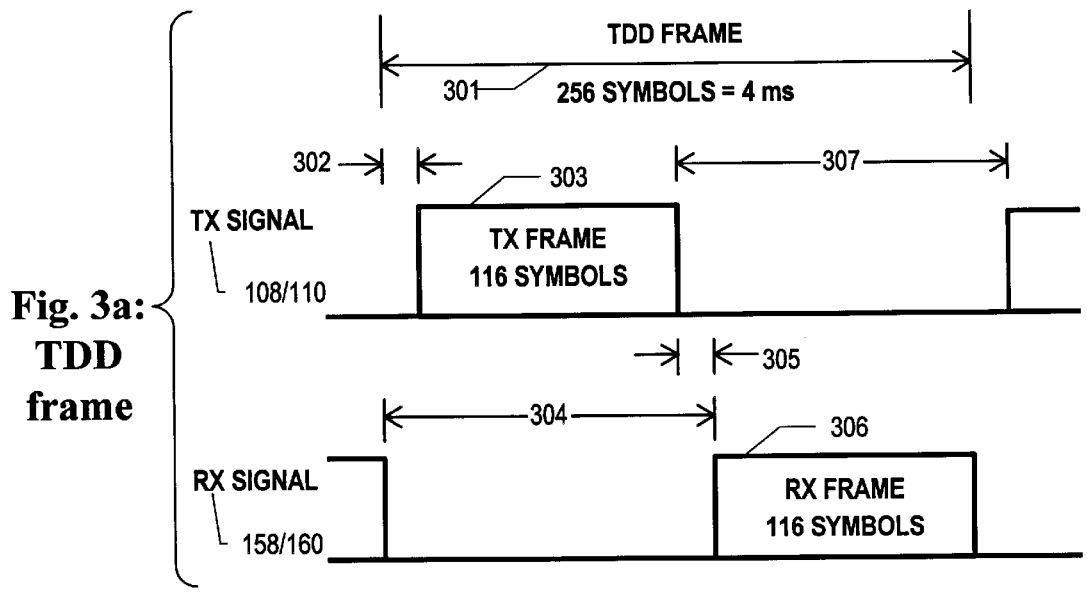
Fig. 3a: TDD frame
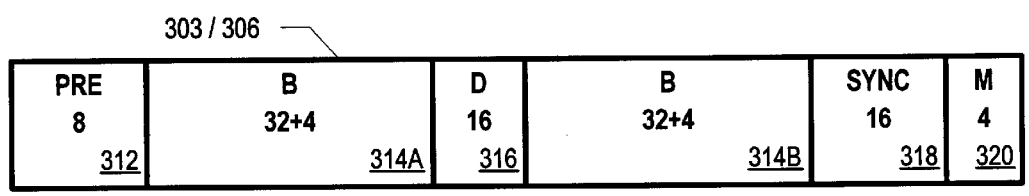
Fig. 3b: Transmit or received frame
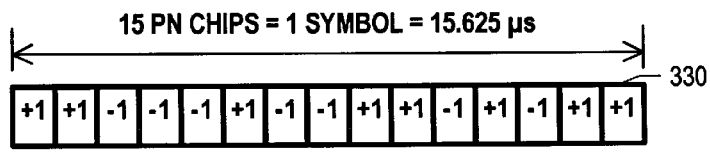
Fig. 3c: PN sequence

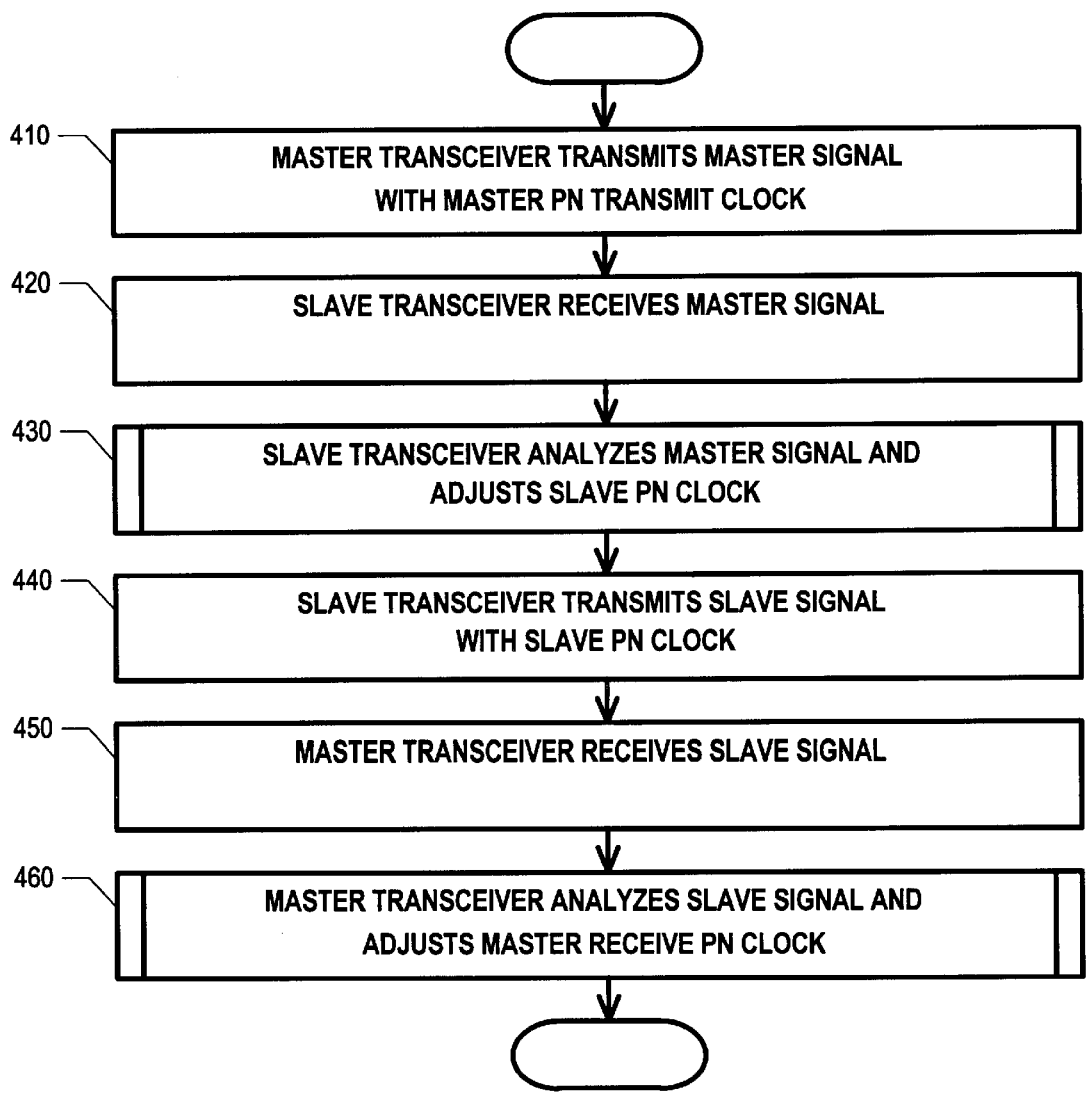
Fig. 4: Flowchart of PN synchronization.

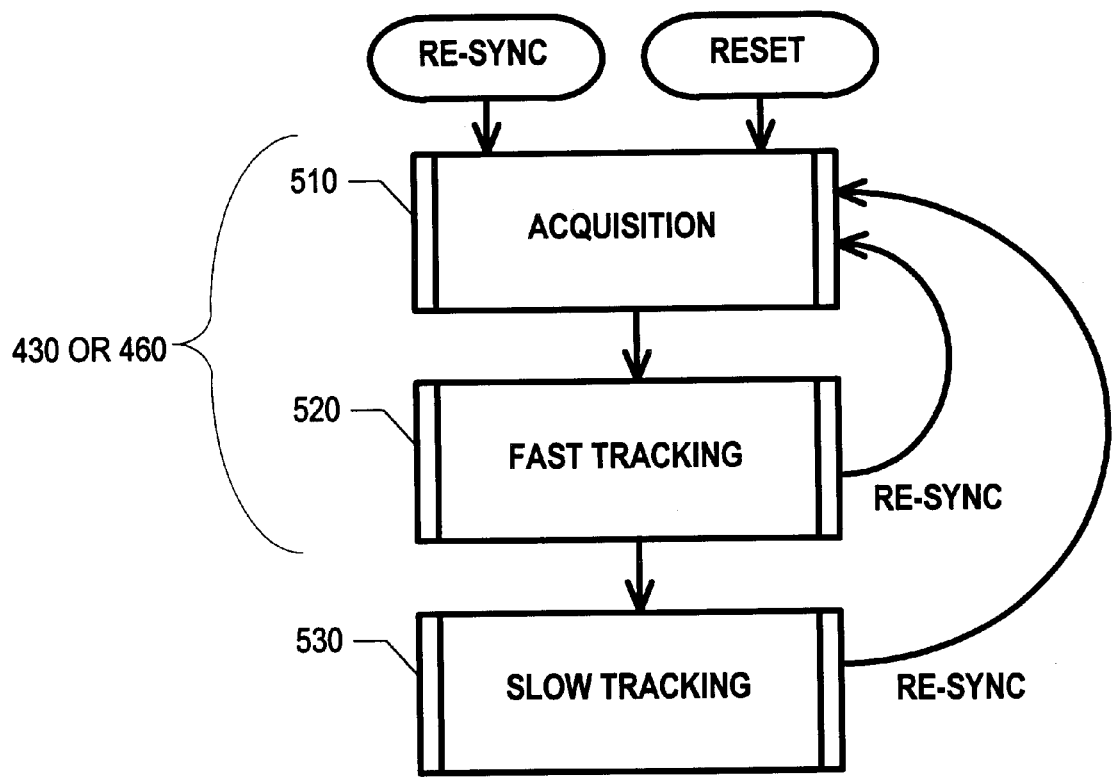
Fig. 5: States of PN timing recovery.

Acquisition flowchart.

Maximum-likelihood detection flowchart.

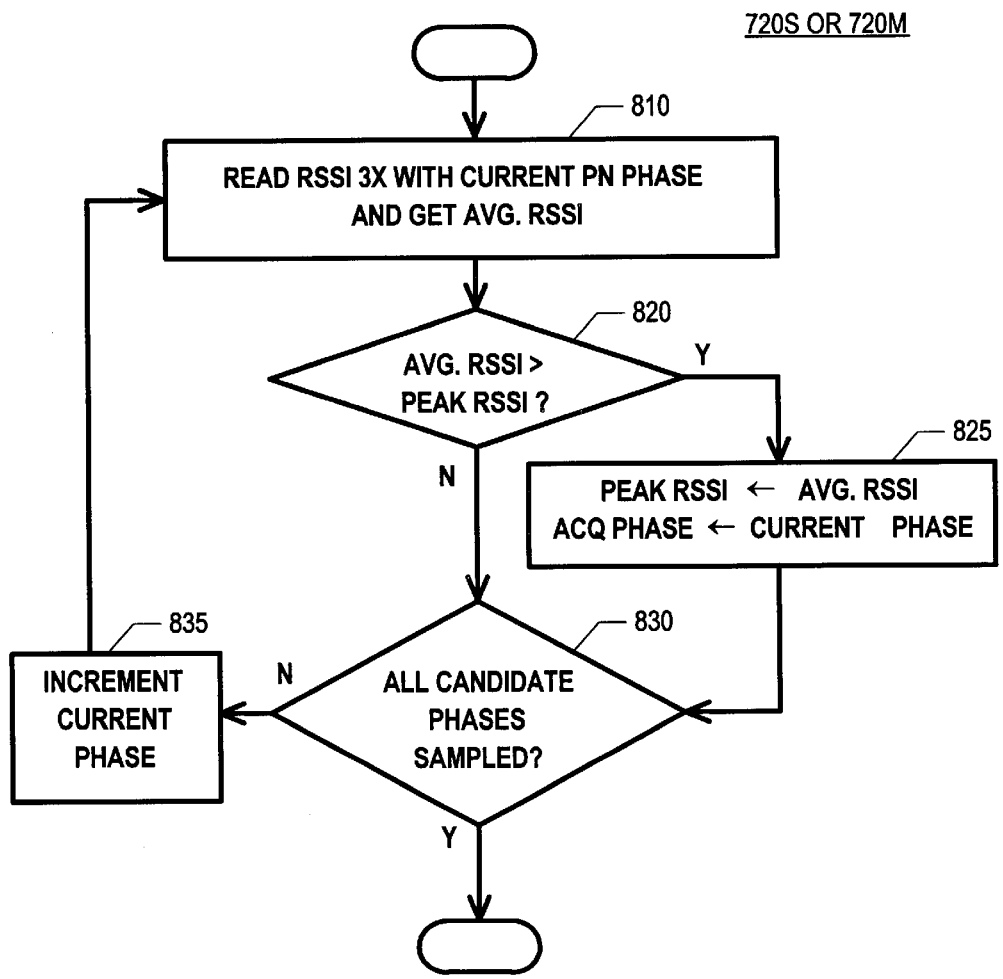
Fig. 8: Flowchart for finding acquired phase in maximum-likelihood detection

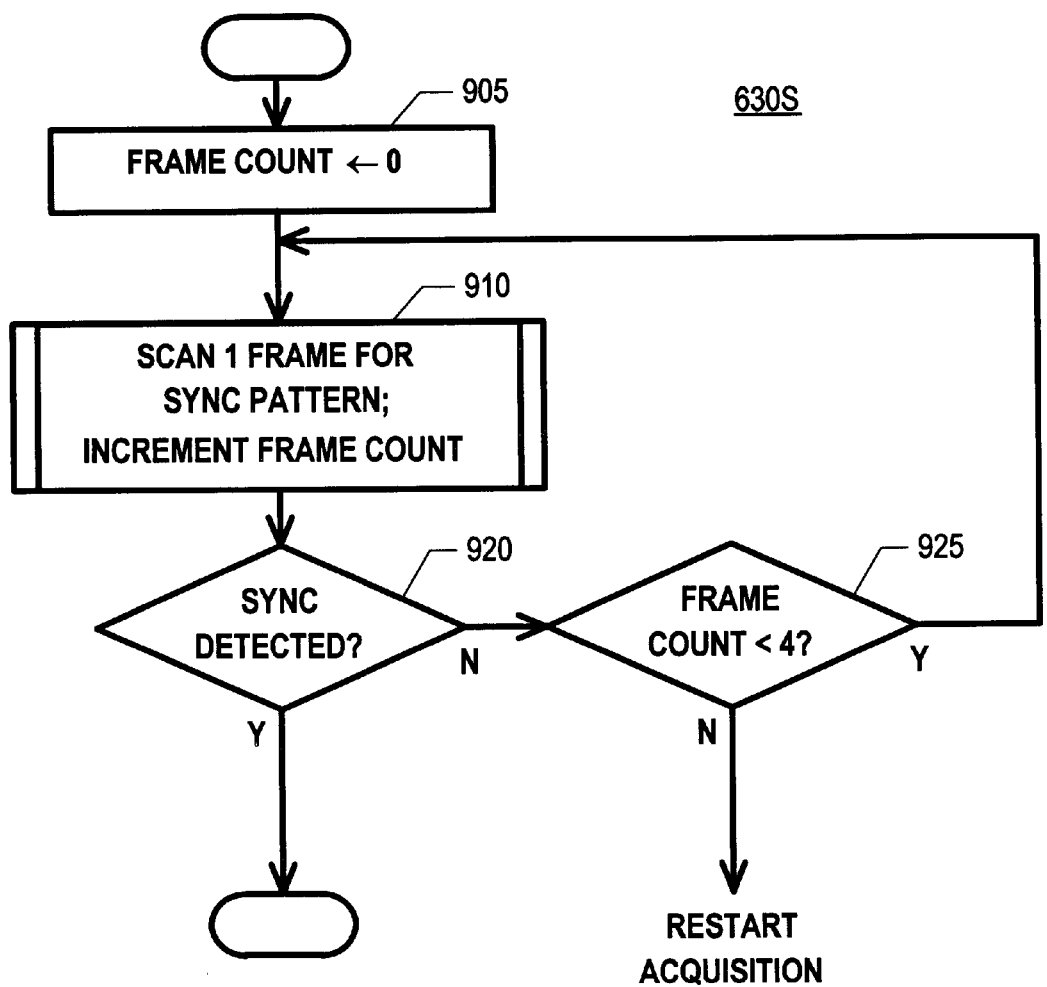
Fig. 9: Flowchart for seeking SYNC pattern.

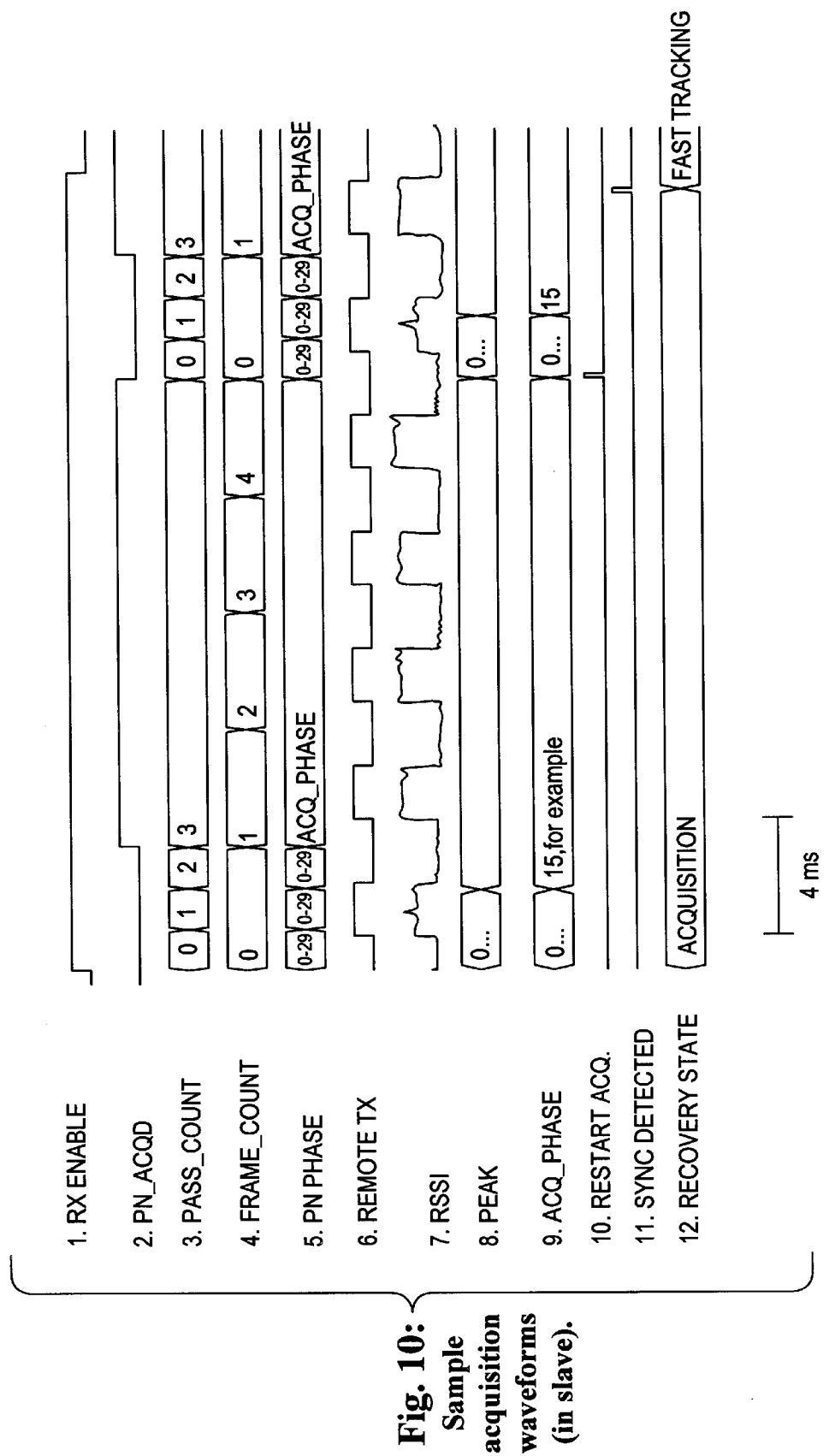
Fig. 10: Sample acquisition waveforms (in slave).

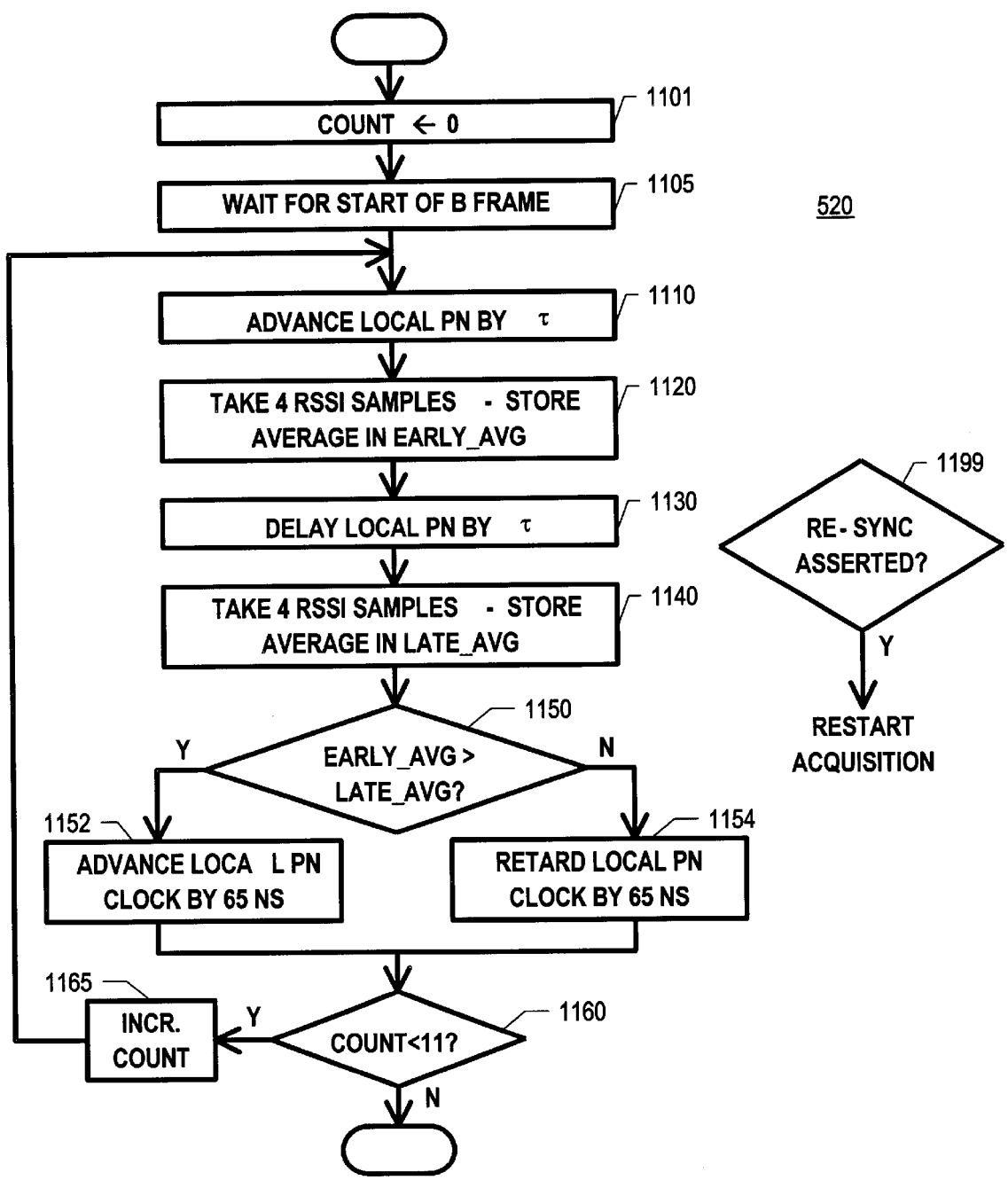
Fig. 11: Fast tracking PN adjustment

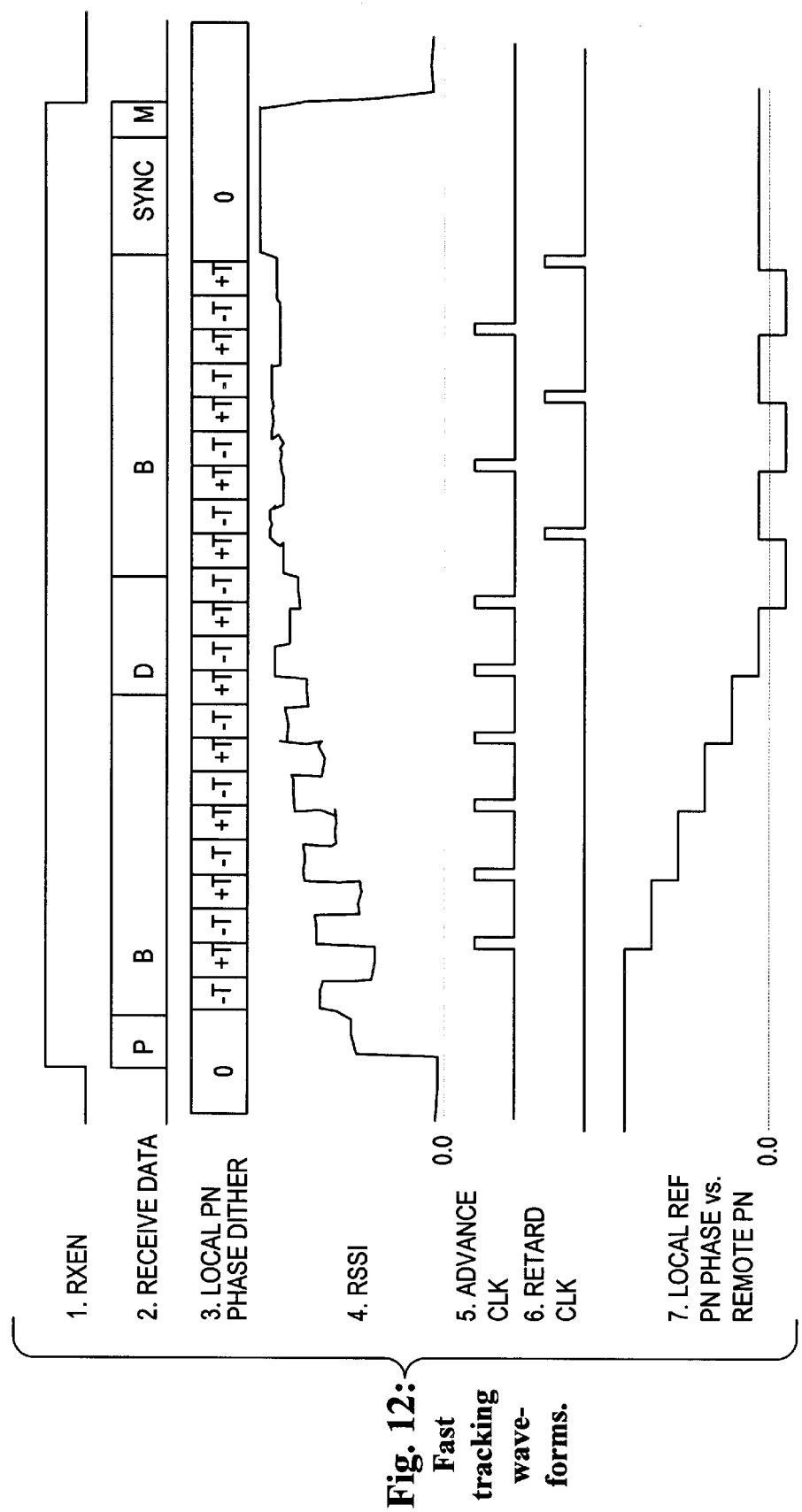
Fig. 12: Fast tracking waveforms.

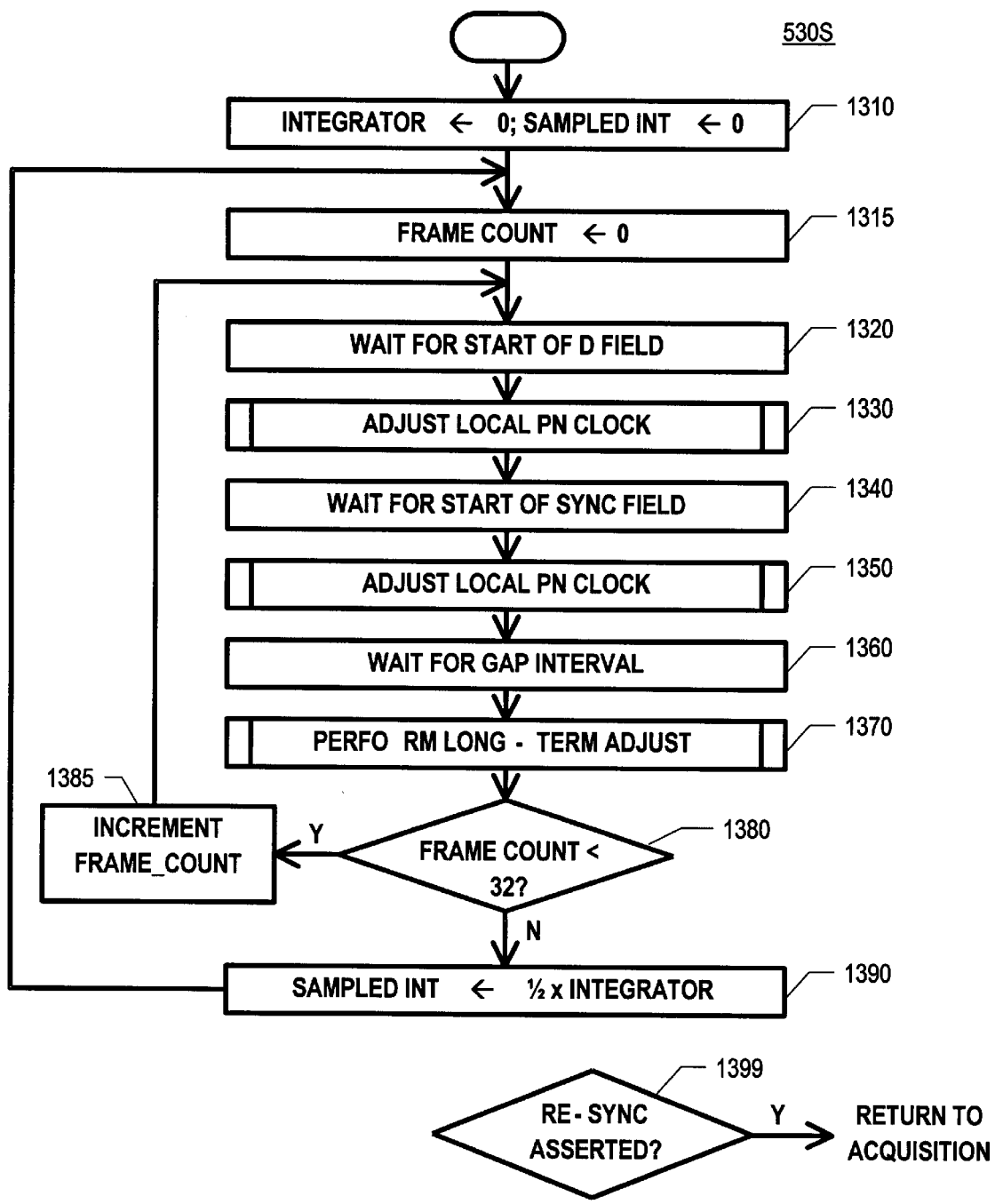
Fig. 13: Flowchart of slow tracking in slave.

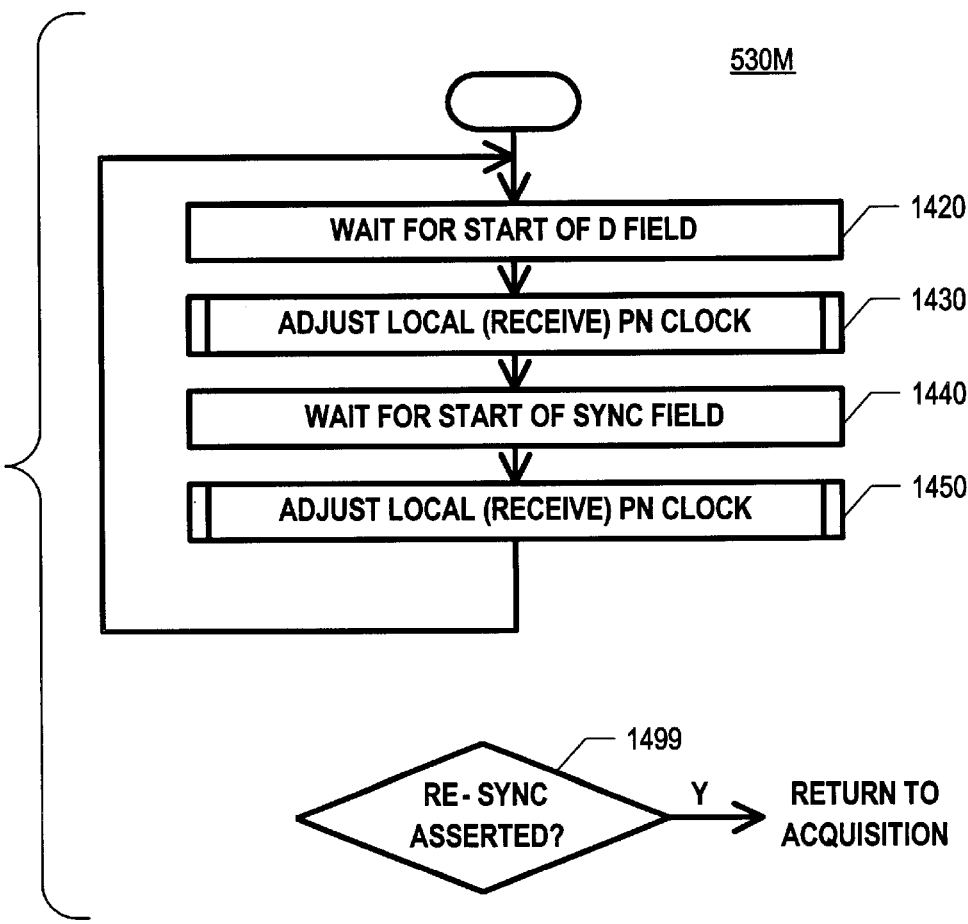
Fig. 14: Flowchart of slow tracking in master.

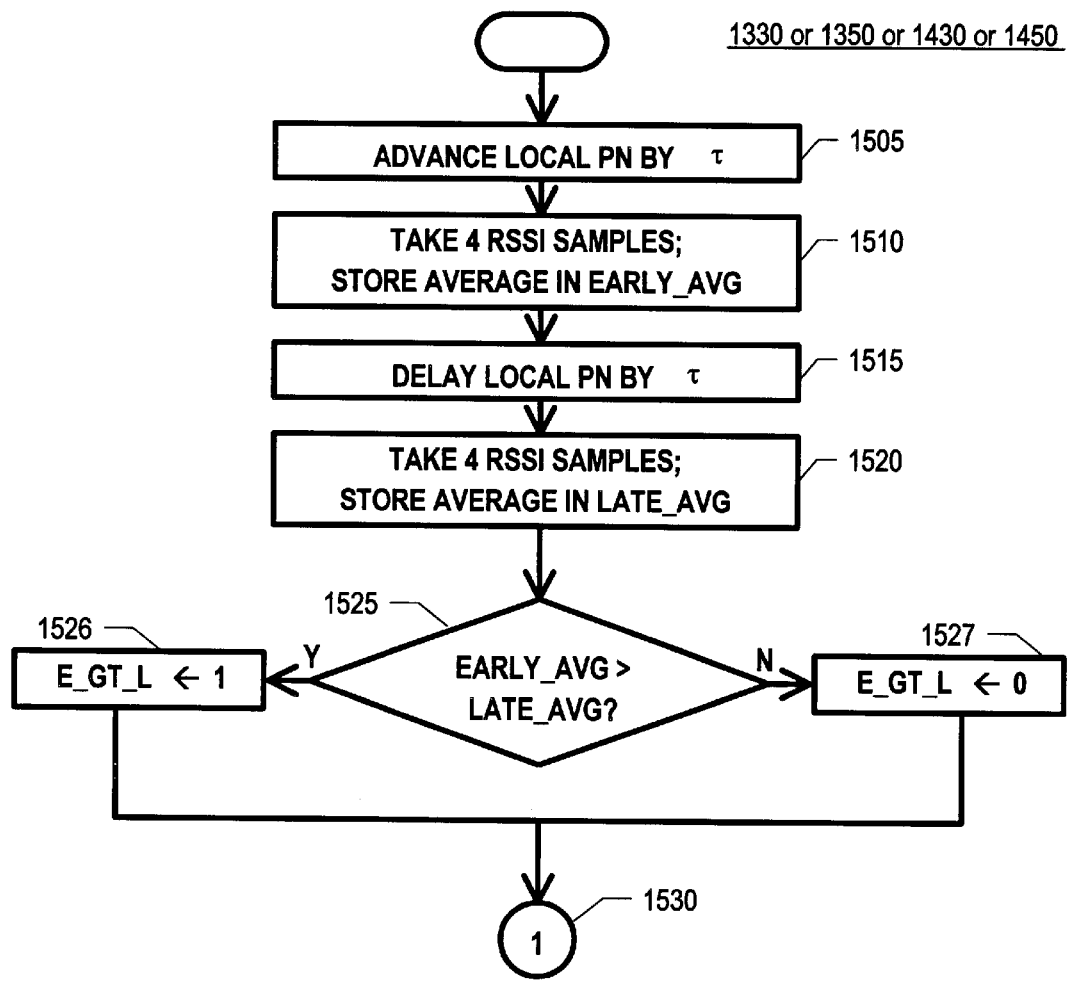
Fig. 15a: Flowchart of slow tracking PN adjustment.

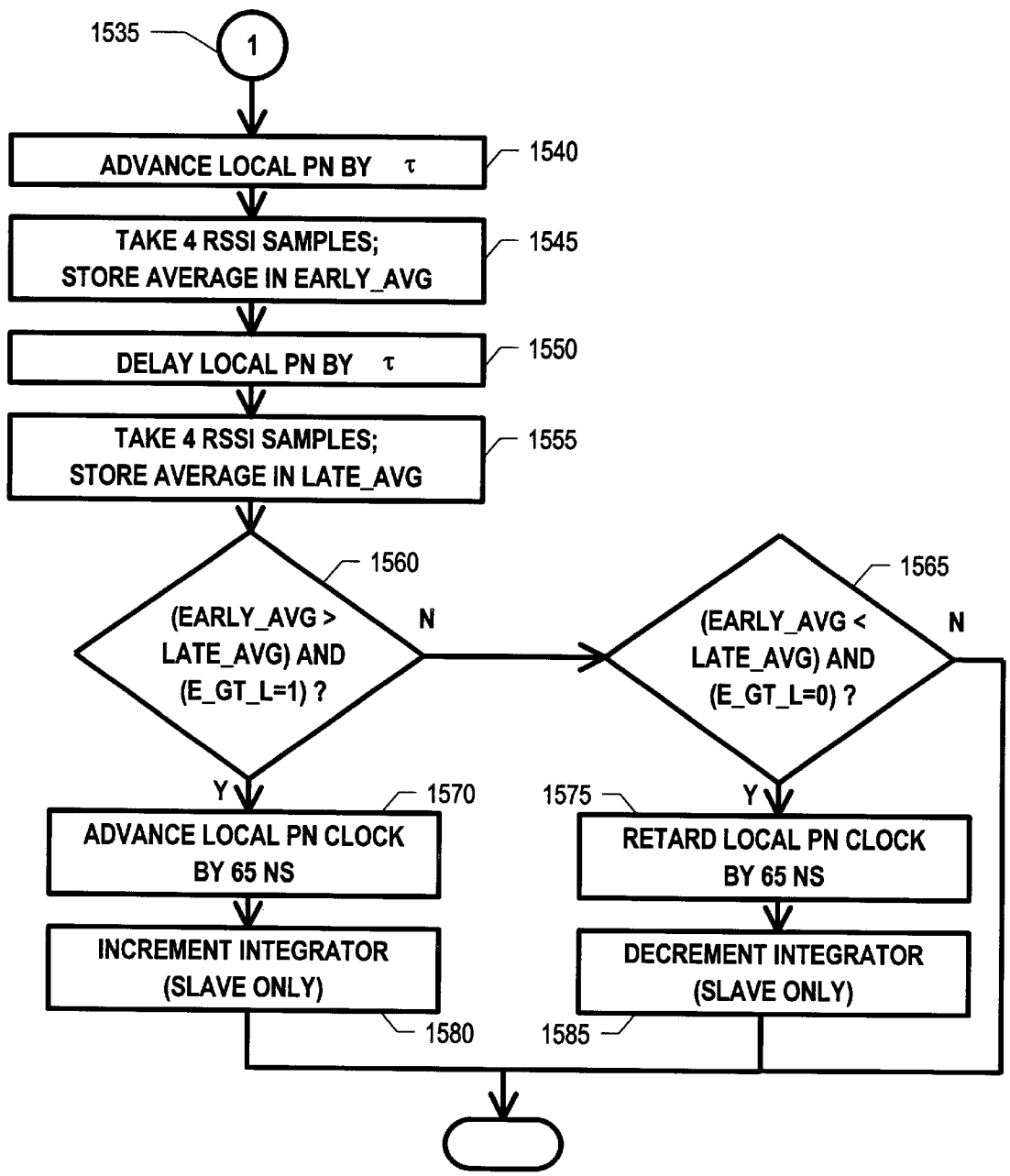
Fig. 15b: Flowchart of slow tracking PN adjustment.

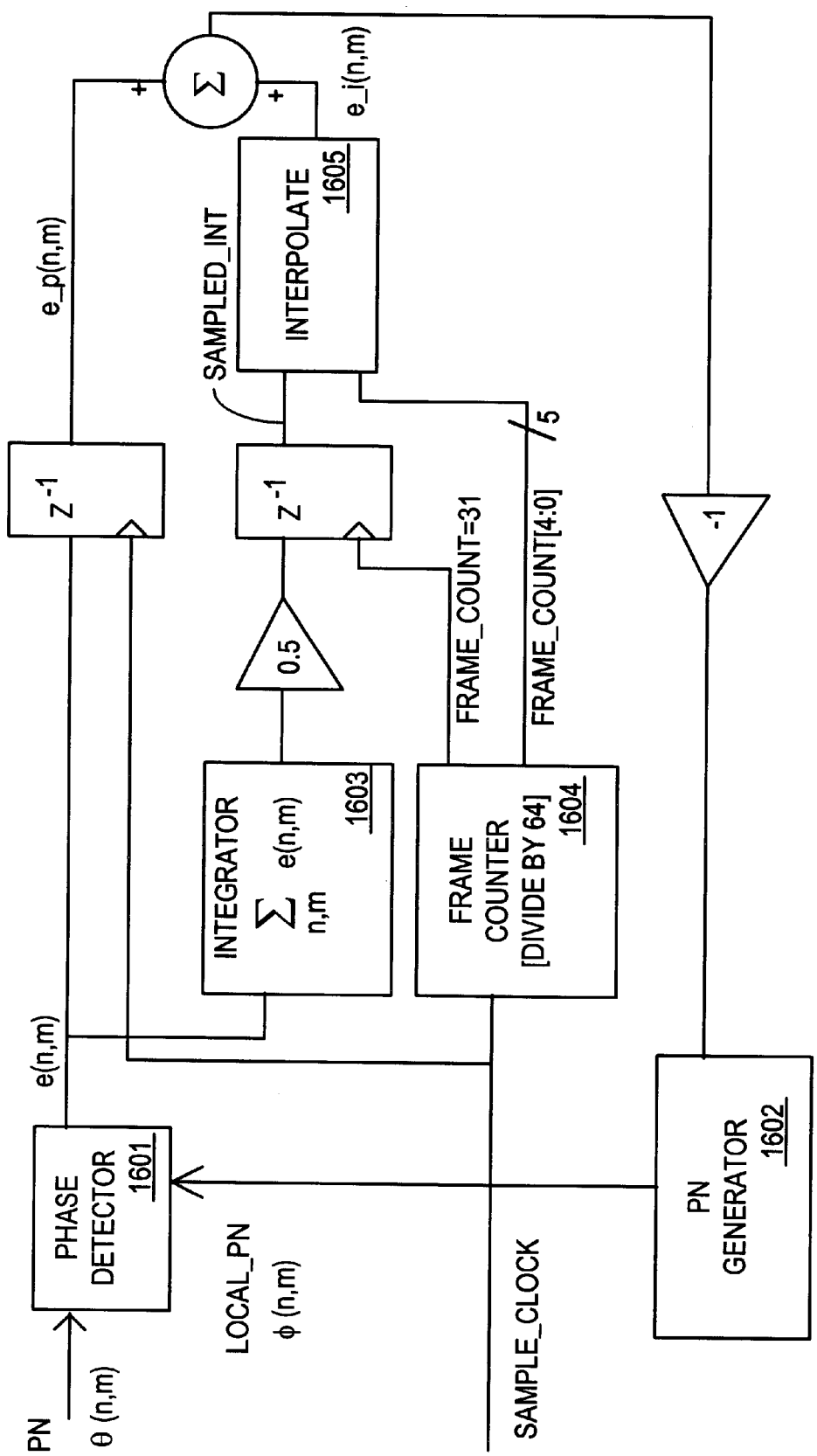
Fig. 16: Model for long-term tracking.

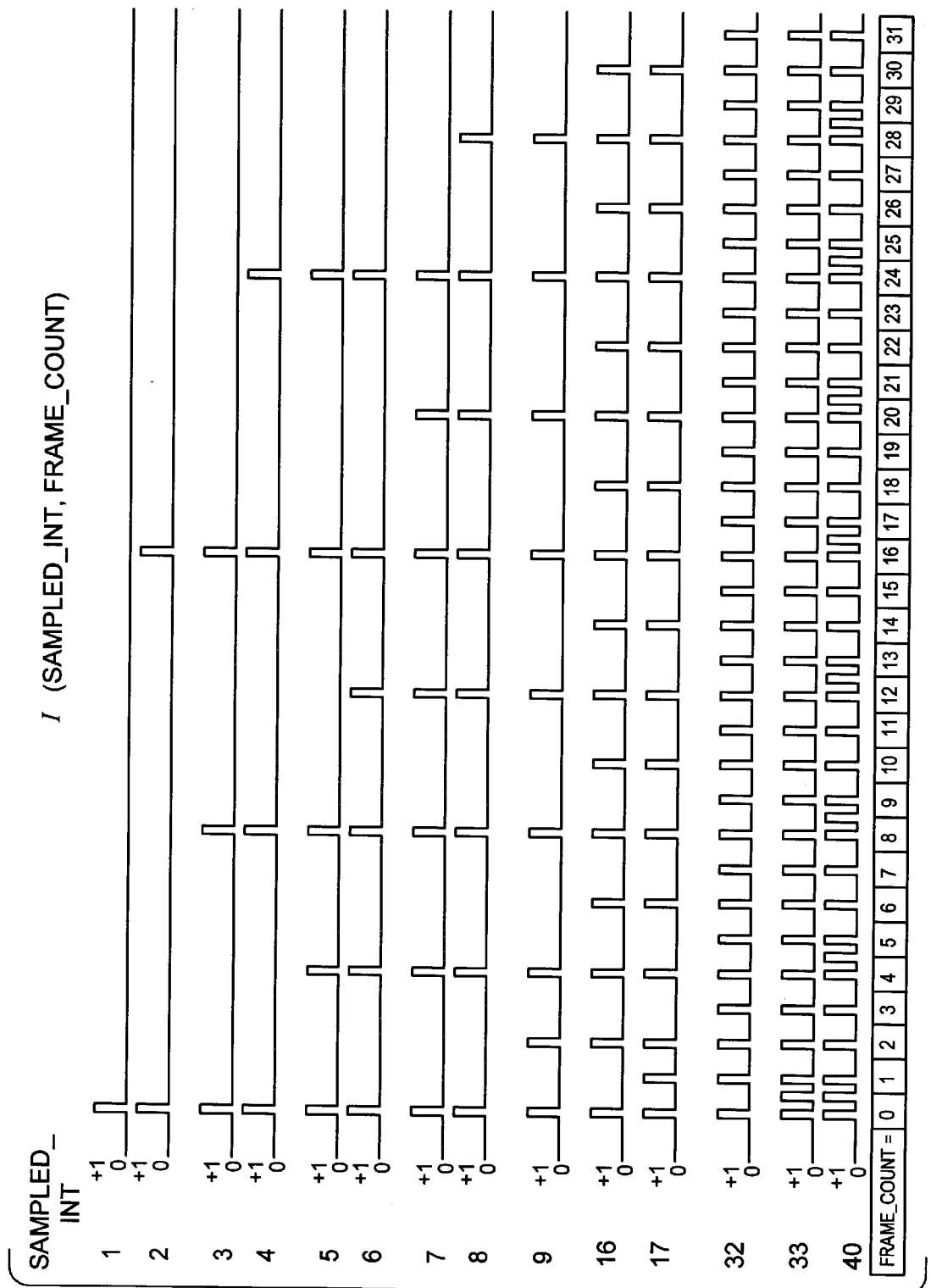
Fig. 17: Pattern of adjustment for long-term tracking.

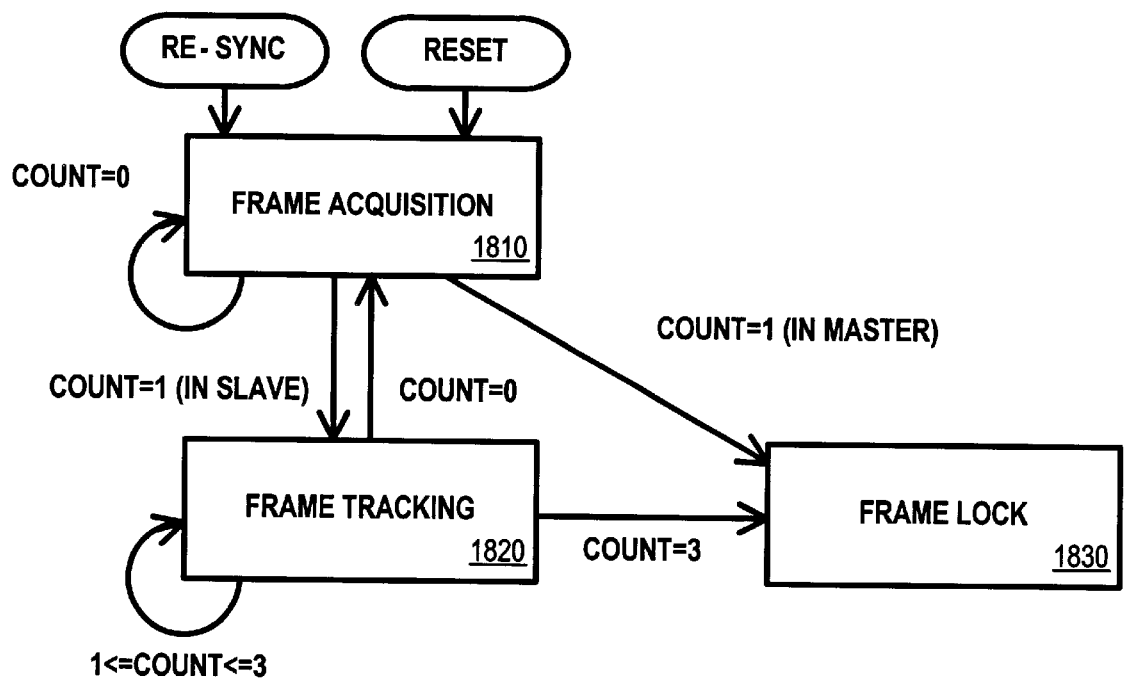
Fig. 18: Frame synchronization state machine.

RAPID ACQUISITION OF PN SYNCHRONIZATION IN A DIRECT-SEQUENCE SPREAD-SPECTRUM DIGITAL COMMUNICATIONS SYSTEM

CONTINUATION INFORMATION

This application is a continuation-in-part of U.S. application Ser. No. 08/976,175 titled "Timing Recovery for a Pseudo-Random Noise Sequence in a Direct-Sequence Spread-Spectrum Communications System," by inventors Alan Hendrickson and Ken Tallo, filed on Nov. 21, 1997, and assigned to the assignee of this application; which in turn claims the benefit of priority of U.S. Provisional Application Ser. No. 60/031,350 titled "Spread Spectrum Cordless Telephone System and Method," by inventors Alan Hendrickson, Paul Schnizlein, Stephen T. Janesch, and Ed Bell, filed on Nov. 21, 1996.

BACKGROUND OF THE INVENTION

1. Field of the Invention

The invention relates to electronic communication and, more particularly, to the synchronization of a pseudo-random noise sequence in a direct-sequence spread-spectrum communications system.

2. Description of the Related Art

Cordless telephones are generally known in the art and are popular with residential and individual consumers. As cordless telephone technology advances, cordless telephones may also prove advantageous to other consumers, such as businesses and commercial groups. When cordless telephones are designed for the lower-end residential and individual consumer market, price and quality are primary considerations of those consumers. Digital telephones tend to provide greater sound quality and capabilities than analog telephones. It is desirable, therefore, that a digital cordless telephone of good quality and adequate capabilities be available to that lower-end market. The cordless telephone market is particularly price-conscious. Low-end consumers, such as residential and individual users, particularly look for economy. Although various designs of digital cordless telephones may be available, those designs have not adequately met the consumer's need for quality as well as economy. A digital cordless telephone that meets those expectations of consumers would thus provide significant improvement and advance in the technology.

Beyond those two expectations of quality and economy of cordless telephone consumers, residential and individual cordless telephone users must typically operate within a limited bandwidth. This restriction presents problems that must be addressed by digital cordless telephone designers. For example multiple users may need to simultaneously communicate within the narrow bandwidth. In order to avoid interference among users and inaccurate communications in those cases, designs of digital cordless telephones must account for this multiple user scenario. This is complicated by the fact that those designs must also meet market requirements such as quality and low price, as previously described.

Certain newer cordless telephones are employing spread spectrum technology. Direct sequence spread spectrum technology involves spreading the narrowband communications signal over a wide frequency band, thus reducing the amount of power in each portion of the frequency band. The principle advantage of spread spectrum transceivers in the United States is the ability to transmit at greater power levels in the 902–928 MHz ISM band under FCC regulations, thereby attaining greater range of handset mobility with respect to the base as compared to lower-power narrowband transmissions. Other advantages of this spreading include an improved rejection of interference signals, and a greater resistance to multi-path fading—which can cause a handset to lose contact with a base unit in certain volumes of space. Current spread-spectrum cordless telephone solutions utilize inherently expensive architectures or compromise performance in order to reduce cost.

One particular aspect of the spread spectrum cordless telephones that bears further improvement is the synchronization of a pseudo-random noise (PN) sequence in the receivers of systems that employ time-division duplexing (TDD). The PN sequence, also known as a "spreading sequence" or "spreading code," is a sequence of values, called "chips", each with a duration substantially shorter than the duration of the information symbols in the transmitted signal. The transmitted signal is modulated with the PN sequence, thereby spreading the frequency spectrum of the transmitted signal.

In some direct sequence spread spectrum communications transceivers the PN sequence is a repeated finite sequence of binary values (+1's or −1's). The length of the sequence varies between implementations. The repeated sequence preferably has the three randomness properties of balance, run, and correlation. These three properties give the repeated sequence a resemblance to a random sequence. The balance property of the repeated sequence is that it should have an equal number of high and low values. Ideally, the number of +1's in the repeated sequence differs from the number of −1's by at most one. The run property of the repeated sequence concerns the grouping of consecutive +1's or consecutive −1's in the sequence. Each grouping of consecutive values is called a "run." Among the runs of the repeated sequence, preferably about one-half have length one, about one-quarter have length two, one-eighth have length three, etc. The correlation property of the repeated sequence dictates that if the repeated sequence is compared term-by-term with a shifted version of itself, then about half of the comparisons are agreements, and half are disagreements. That is, the autocorrelation function of the repeated sequence is strongly peaked at zero shift.

In order for a receiving unit to de-spread the received spread spectrum signal, the receiving unit must have a receiver PN sequence that is synchronized with the PN sequence in the received signal. That is, each of the repeated sequences in the receiver PN sequence must start at the same time as the repeated sequences encoded in the received signal. Put another way, the phase of the receiver PN sequence must match that of the PN sequence in the received signal. With this synchronization, the receiver can demodulate the binary PN sequence from the received signal and regenerate the original narrowband signal. The process of synchronizing the receiver PN sequence to the PN sequence in the received signal is PN timing recovery.

The field of digital communication has evolved a variety of techniques for performing the PN timing recovery. Principal among these is the "maximal likelihood" or "sliding correlator" method, which measures correlations between the received signal and a locally generated receiver PN signal. The receiver PN signal is progressively phase-shifted until a peak correlation is detected. This method has several disadvantages that cause it to be prone to false detection of synchronization. This method is especially lacking in TDD communications systems, in which two transceivers communicate on a single frequency channel by alternating between transmitting and receiving data. In a TDD receiver, the maximal likelihood method is susceptible to false synchronization resulting from the rapid change in received signal power as the remote transceiver switches from receive to transmit modes. Thus, it would be desirable to have a robust hardware-implemented system for acquiring the PN timing in a direct-sequence spread-spectrum TDD communications system.

Improvements can also be made to the techniques for synchronizing the frame timing in TDD receivers with the frame sequence in the received signals. This synchronization is typically performed by constructing the transmitted frames with a SYNC field—a predetermined fixed pattern of data that occurs repeatedly in the same position in the frame. The SYNC field may be included in every transmitted frame, allowing a robust measure of synchronization, or it may be included less often, allowing greater data transmission rates. The receiver monitors the received data for the SYNC pattern, and upon detecting it, sets the frame timing accordingly. After the frame timing is set, the receiver may continue to monitor the data to verify that the SYNC pattern occurs in the expected positions.

Current receivers typically monitor the received data for the SYNC pattern using the same high-level systems that read the desired data from the received frames. It would be desirable to have a more self-contained system for synchronizing the receiver with the frame timing in the received signal. Such a system would independently acquire and maintain the frame synchronization without disrupting other systems and functions of the receiver.

SUMMARY OF THE INVENTION

Described herein are systems and methods for synchronizing a direct sequence spread spectrum communication receiver's local pseudo-noise (PN) sequence with the received PN sequence in a received signal, and for synchronizing a digital receiver's local frame timing with the frame timing in the received signal.

PN Synchronization—Rapid Acquisition

In one embodiment, the receiver and a remote transmitter are part of a time-division duplexing (TDD) or a time-division multiple-access (TDMA) communications system. The receiver uses a maximal-likelihood (ML) detection system to scan through a range of possible PN phases to determine the correct one. Whichever of the possible PN phases has the maximum correlation with the received signal is expected to be the correct PN phase. Because of the TDD or TDMA nature of the received signal, however, it is necessary to ensure that the receiver tests the correct PN phase when the remote transmitter is transmitting— otherwise an incorrect PN phase may falsely be determined to have the maximum correlation.

In one embodiment of a method for performing the synchronization, the receiver acquires the PN phase by repeating the ML detection for a time greater than or equal to the period of the TDD or TDMA frames, with a sufficiently high repetition rate to ensure that the correct PN phase is examined at least once during a received frame. The acquisition is thereby completed within a fixed amount of time. One embodiment of a system for performing the synchronization includes an input for the received signal, a receiver PN clock, and an ML detection logic. The ML detection logic repeats the ML detection so that at least one complete set of PN phases is examined during a time when the received signal is active.

Another embodiment of the method for performing the synchronization is preferably used in a communications system where the receiver is incorporated in a "master" transceiver and the remote transmitter is incorporated in a "slave" transceiver. The master transceiver initiates a communications link by sending a TDD or TDMA frame to the slave transceiver. When the slave transceiver receives an initiating frame, it responds by transmitting a response frame in a predetermined timeslot. The receiver in the timing master then acquires the PN phase by performing the ML detection during the timeslot, which has a predetermined relationship in time to the initiating frame. Again, the acquisition is completed within a fixed amount of time. One embodiment of a system for performing this synchronization includes an input for the received signal, a receiver PN clock, and ML detection logic that performs the ML detection during the timeslot.

PN Synchronization—Verification

In a second embodiment of the receiver, the initially acquired PN phase is verified by confirming (1) that the PN synchronization allows a SYNC field (comprising a predetermined pattern and present in each received frame) to be read from the received signal, and (2) that shifting the local PN phase results in a degraded correlation between the local PN sequence and the received signal.

One embodiment of a method for performing the synchronization with the verification includes steps of: (a) determining an initial value of the received PN phase, (b) setting the receiver PN phase equal to the initial value of the received PN phase, (c) a first testing to confirm that the receiver identifies a SYNC field within a testing time of predetermined duration, (d) a second testing, performed only if the first testing is passed, to confirm that a temporarily shifted PN sequence results in a degraded correlation measurement between the receiver PN sequence and the received PN sequence (which is comprised in the received signal), and (e) repeating steps (a)–(d) if either of the testings indicate that the receiver PN sequence is not correct.

One embodiment of a system for performing the synchronization with the verification includes an input for receiving a received spread-spectrum data stream, an ML detection logic, a receiver PN clock, a despreading mixer that generates a narrowband signal from the spread-spectrum data stream, a first testing logic that generates a PASS output if it identifies a SYNC field in the narrowband signal during a testing period, and a second testing logic that temporarily shifts the receiver PN clock and generates a PASS output if the temporary shifting degrades the correlation measurement between the receiver PN sequence and the received PN sequence.

PN Synchronization—Fast Tracking

In a third embodiment, the receiver again waits for detection of a SYNC field to confirm at least a coarse synchronization or the receiver's local PN sequence with the received PN sequence (in the received signal). In this embodiment, the receiver then performs a fast tracking to finely synchronize the receiver's PN sequence with the received PN sequence. The fast tracking is preferably performed for a fixed duration of time and preferably includes making one or more advancements or delays of the receiver's PN sequence if correlation measurements indicate that the receiver's PN sequence lags or leads the received PN sequence.

One embodiment of a system for performing the synchronization with the fast tracking includes an input for receiving a received spread-spectrum data stream, an ML detection logic, a receiver PN clock, a despreading mixer that generates a narrowband signal from the spread-spectrum data stream, a testing logic that generates a PASS output if it identifies a SYNC field in the narrowband signal, and a fast-tracking logic. The fast-tracking logic temporarily advances and temporarily delays the receiver PN clock by a small shift and measures the resulting correlations between the receiver's PN sequence and the received PN sequence. If the advanced correlation is greater than the delayed correlation, then the fast-tracking logic makes a small adjustment to advance the receiver PN clock. If the delayed correlation is greater than the advanced correlation, then the fast-tracking logic makes a small adjustment to delay the receiver PN clock. This temporary advancing, temporary delaying, and adjusting of the receiver PN clock is preferably repeated a fixed number of times.

PN Synchronization—Slow Tracking

A fourth embodiment of the receiver performs a slow tracking to maintain the synchronization of the receiver's PN sequence with the received PN sequence. The slow tracking is preferably performed continuously after the initial acquisition and fast tracking. The slow tracking preferably includes one or more advancements or delays of the receiver's PN sequence if correlation measurements consistently indicate that the receiver's PN sequence lags or leads the received PN sequence. The slow tracking preferably also includes a long-term adjustment of the receiver's PN phase, distributed over a number of received frames, to compensate for any frequency offsets between the receiver's PN sequence and the received PN sequence.

One embodiment of a system for performing the synchronization with the fast tracking includes an input for receiving a received spread-spectrum data stream, a receiver PN clock, and a slow-tracking logic. The slow-tracking logic temporarily advances and delays the receiver PN clock by a small shift and checks if either advancing or delaying consistently result in improved correlations. If so, the slow-tracking logic adjusts the receiver PN clock accordingly. The slow tracking logic preferably also includes a counter that maintains an integrated total of the adjustments to the receiver clock. The integrated total adjustment is used to determine the long-term adjustment.

Frame Synchronization

In a fifth embodiment, the receiver synchronizes an internal frame clock with a series of received data frames in the received data stream. One embodiment of a method for performing the frame synchronization proceeds by first recovering a symbol timing for data symbols in the received frames, then acquiring a frame timing by scanning the received data symbols for the SYNC field only during a narrow detection window around an expected location in time for the SYNC field, and then locking the frame timing. An embodiment of a system for performing the frame synchronization comprises an input for receiving the data frames in the received data stream, a symbol clock that indicates symbol transitions in the received data stream, timing logic that indicates the detection window during which the a SYNC field is expected, a SYNC-field detector, and a receiver frame clock.

BRIEF DESCRIPTION OF THE DRAWINGS

Other objects and advantages of the invention will become apparent upon reading the following detailed description and upon reference to the accompanying drawings in which:

FIGS. 1A, B, and C show a representative direct-sequence spread-spectrum transceiver, a block diagram of the primary modules in the transceiver, and a schematic of the transceiver;

FIG. 2 is a block diagram of the passband DQPSK decoder from FIG. 1;

FIGS. 3a, b, and c illustrate the timing of the transmit and received frames in a TDD system, the fields in a transmit or received frame, and an example PN sequence used to spread the transmitted signals;

FIG. 4 is a flowchart of the PN synchronization procedure;

FIG. 5 shows the states of PN synchronization;

FIG. 8 is a flowchart for finding the acquired phase in maximum-likelihood detection;

FIG. 9 is a flowchart for seeking the SYNC pattern;

FIG. 10 illustrates sample acquisition waveforms in the slave transceiver;

FIG. 11 is a flowchart of the PN adjustment in fast tracking;

FIG. 12 illustrates sample fast tracking waveforms;

FIG. 13 is a flowchart of slow tracking in the slave transceiver;

FIG. 14 is a flowchart of slow tracking in the master transceiver;

FIGS. 15a and b are a flowchart of the PN adjustment in slow tracking;

FIG. 16 is a flowchart of the long-term PN adjustment in slow-tracking;

FIG. 17 illustrates the patterns of adjustment for long-term tracking; and

FIG. 18 shows the frame synchronization state machine.

DETAILED DESCRIPTION OF THE INVENTION

Figure 6:
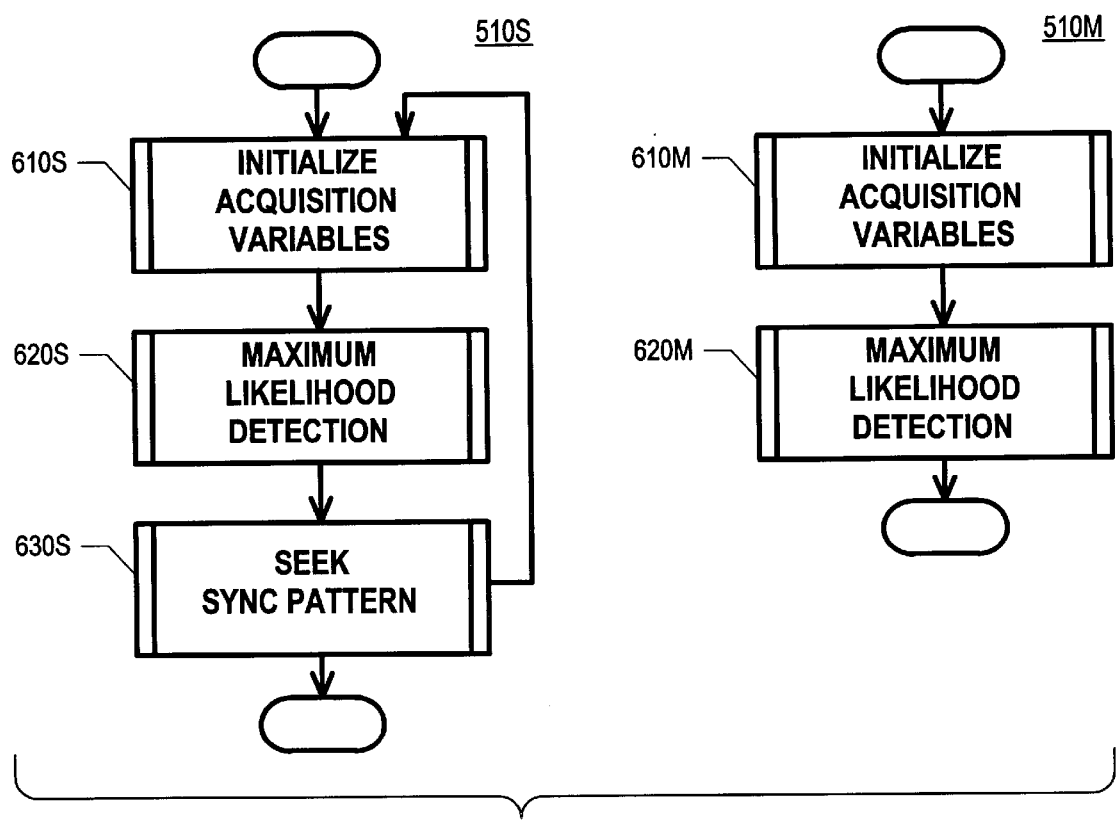
FIG. 6 is a flowchart of the acquisition procedure.

The following patent applications are hereby incorporated by reference in their entirety as though fully and completely set forth herein:

U.S. Provisional Application Ser. No. 60/031,350, titled "Spread Spectrum Cordless Telephone System and Method" and filed Nov. 21, 1996, whose inventors are Alan Hendrickson, Paul Schnizlein, Stephen T. Janesch, and Ed Bell;

U.S. application Ser. No. 08/968,030, titled "Verification of PN Synchronization in a Spread-Spectrum Communications Receiver" and filed Nov. 12, 1997, whose inventor is Alan Hendrickson;

U.S. application Ser. No. 08/974,966, titled "Parity Checking in a Real-Time Digital Communications System" and filed Nov. 20, 1997, whose inventors are Alan Hendrickson and Paul Schnizlein;

U.S. application Ser. No. 08/976,175, titled "Timing Recovery for a Pseudo-Random Noise Sequence in a Direct Sequence Spread Spectrum Communications System" and filed Nov. 21, 1997, whose inventors are Alan Hendrickson and Ken M. Tallo;

U.S. application Ser. No. 08/975,142, titled "Passband DQPSK Detector for a Digital Communications Receiver" and filed Nov. 20, 1997, whose inventors are Alan Hendrickson and Paul Schnizlein;

U.S. application Ser. No. 08/968,202, titled "An Improved Phase Detector for Carrier Recovery in a DQPSK Receiver" and filed Nov. 12, 1997, whose inventors are Stephen T. Janesch, Alan Hendrickson, and Paul Schnizlein;

U.S. application Ser. No. 09/078,225, titled "Symbol-Quality Evaluation in a Digital Communications Receiver" and filed May 13, 1998, whose inventor is Alan Hendrickson;

U.S. application Ser. No. 08/968,028, titled "A Programmable Loop Filter for Carrier Recovery in a Radio Receiver" and filed Nov. 12, 1997, whose inventors are Stephen T. Janesch and Paul Schnizlein;

U.S. application Ser. No. 08/968,029, titled "A Carrier-Recovery Loop with Stored Initialization in a Radio Receiver" and filed Nov. 12, 1997, whose inventors are Stephen T. Janesch, Paul Schnizlein, and Ed Bell;

U.S. application Ser. No. 09/078,145, titled "A Method for Compensating Filtering Delays in a Spread-Spectrum Receiver" and filed May 13, 1998, whose inventor is Alan Hendrickson;

U.S. application Ser. No. 09/082,748, titled "Down-Conversion to an Intermediate Frequency for DSP Processing of a Digital Communication Signal" and filed May 21, 1998, whose inventors are Stephen T. Janesch, Paul Schnizlein, Alan Hendrickson, and Ed Bell.

FIG. 1: Spread-Spectrum Communication System

FIG. 1a is a representative view of a time-division duplexing (TDD) transceiver 10 that communicates with a remote transceiver (not shown) through a direct-sequence spread spectrum signal. A block diagram of the transceiver's signal-processing components is shown in FIG. 1b. The components and the associated signals in the transceiver are further described in FIG. 1c. The invention is preferably comprised in such transceiver 10, which has a local transmitter 100 that transmits a radio frequency (RF) transmit signal 110 to the remote transceiver, and a local receiver 150 that receives an RF received signal 160 from the remote transceiver.

As shown in FIG. 1b, a differential quadriphase shift-keying (DQPSK) line coder 106 in the transmitter 100 receives a stream of digital transmit data 102 and encodes it into a complex baseband transmit signal 107 that comprises a series of information symbols each with a duration of a symbol period. In one embodiment of the invention, the symbol period is 15.625 $\mu$s, implying a symbol rate of 64 kS/sec. The baseband transmit signal 107 is upconverted to an intermediate-frequency (IF) transmit signal 108 in a complex IF mixer 125. In one embodiment of the invention, this first intermediate frequency is IF1=10.7 MHz. A spreading mixer 135 receives the transmit signal 108 and multiplies it by a pseudo-random noise (PN) sequence that is further described below. The timing of this PN sequence is controlled by a transmitter PN clock 131.

The multiplication by the transmitter PN sequence spreads the frequency spectrum of the narrowband transmit signal 108. The resulting wideband IF transmit signal 109 is provided to a RF modulator 146 that multiplies it with a radio-frequency tone to generate the RF transmit signal 110. In one embodiment of the invention, this frequency is in the vicinity of 900 MHz. The RF transmit signal 110 is then sent through a transmitting antenna 148 to the remote transceiver (not shown).

The receiver 150 in the transceiver 10 comprises components that reverse the processing steps of those in the transmitter 100. A receiving antenna 198, which is preferably the same physical component as the transmitting antenna 148, receives an RF received signal 160 from the remote transceiver and provides it to an RF demodulator 196. The RF demodulator 196 downconverts the RF received signal 160 to a wideband IF received signal 159 at the first intermediate frequency IF1. The wideband received signal 159 is provided to a despreading mixer 185 that multiplies it by a receiver PN sequence to recover a narrowband IF received signal 158. The timing of the receiver PN sequence is controlled by a receiver PN clock 181.

The received signal 158 is amplitude-limited in an IF limiter 175 to produce an amplitude-limited IF signal 157. The final stage of this embodiment of the receiver 150 is a passband DQPSK decoder 156 that receives the limited signal 157 and decodes its symbols to produce a stream of received data 152.

FIG. 1c is a schematic showing more detail of the direct-sequence spread-spectrum transceiver. In the transmitter 100, the digital data 102 are provided to the DQPSK line coder 106. The transmit data 102 are encoded into the baseband signal 107 by the DQPSK line coder 106. The baseband signal 107 is a complex signal: it comprises an I (in-phase) component and a Q (quadrature-phase) component; these components carry the DQPSK symbols which represent the transmit data 102. An IF oscillator 104 generates a complex sinusoidal IF carrier wave 105 for the complex IF mixer 125. The IF mixer 125 multiplies the baseband signal 107 with the intermediate-frequency (IF) carrier 105. This carrier 105 is a complex carrier with a sinusoidal I component and a sinusoidal Q component that is 90° offset in phase from the I component. The result of the multiplication in the mixer 125 is the DQPSK IF transmit signal 108. This signal 108 can be described as a tone at the IF1 carrier frequency with one of four discrete phases, each separated by an integral multiple of $\pi/2$. The phase remains constant for the duration of a symbol period, and then changes as dictated by the next DQPSK symbol. The differences in phase angle between successive information symbols represent the transmit data 102. Since there are four possible carrier phase values, each symbol represents two bits of transmitted data. The frequency IF1 of the IF carrier 105 is determined by the IF oscillator 104.

The spreading mixer 135 multiplies the transmit signal 108 by a transmit PN signal 130 that carries the transmitter PN sequence. The PN signal 130 is a pseudo-random sequence of binary values that persist for a fixed duration. These values, or "chips," are +1's and −1's ordered according to the PN sequence. Each chip has a duration substantially less than the duration of an information symbol, so the effect of the multiplication in the spreading mixer 135 is to broaden the spectrum of the transmit signal 108. The timing of the transmitter PN sequence in the transmit PN signal is governed by the transmitter PN clock 131 in FIG. 1b. The output of the spreading mixer 135 is the wideband IF transmit signal 109, a direct-sequence spread-spectrum signal.

In a preferred embodiment the PN signal is periodic, comprising a pre-determined repeated sequence of PN chips. The duration of the repeated sequence is substantially equal to the duration of one DQPSK symbol. The repeated sequence is further described below in the discussion accompanying FIG. 3c.

The wideband transmit signal 109 is upconverted to the higher radio frequency by the RF modulator 146. The RF modulator 146 multiplies the wideband transmit signal 109 by a radio frequency tone from a local (transmit) RF oscillator 141, eliminates undesirable mixing products, and provides power amplification in order to generate the RF transmit signal 110 suitable for transmission. The frequency of the transmit RF oscillator 141 determines the frequency of the RF transmit signal 110 through normal operation of the RF modulator 146, according to techniques well-known in the art.

The RF transmit signal 110 is efficiently radiated by the transmitting antenna 148 through a transmission medium, such as air, to a remote transceiver (not shown). The remote transceiver likewise transmits an RF signal 160 that is received by the receiving antenna 198 of the local receiver 150 and coupled into the RF demodulator 196.

The RF demodulator 196 in FIG. 1c amplifies the RF received signal 160 within a selected bandwidth and downconverts the result to an intermediate frequency determined by the frequency of a local (receive) RF oscillator 191. The frequency of the receive RF oscillator 191 is specified so that the downconversion of the RF received signal 160 results in the wideband received signal 159 at some convenient desirable frequency. If the RF oscillators 141 and 191 in the local and remote transceivers are constrained to oscillate at substantially the same frequency, then the frequency of the wideband IF received signal 159 is substantially the same as the frequency IF1 of the wideband IF transmit signal 109.

The despreading mixer 185 receives the wideband output 159 of the RF demodulator 196 and multiplies the wideband received signal 159 by a receiver PN signal 180. The product of this multiplication is filtered in a bandpass filter 186 to generate a narrowband IF received signal 158. The receiver PN signal 180 is a predetermined sequence of binary values given by a receiver PN sequence. The receiver PN sequence in the receiver PN signal 180 matches the transmitter PN sequence in the transmit PN signal 130, except that the two sequences may differ by a constant offset in time. The timing of the receiver PN sequence in the receiver PN signal is governed by the receiver PN clock 181 in FIG. 1b.

In a preferred embodiment, the PN sequence is periodic: it comprises a repeated predetermined sequence of chips. This repeated sequence preferably has good randomness qualities of balance, run, and correlation. Since this PN sequence is periodic, its timing can be completely described by a PN phase. The PN clocks 131 and 181 indicate, respectively, the transmitter PNphase, which is the phase of the transmitter PN sequence, and the receiver PNphase, which is the phase of the receiver PN sequence.

The phase of the PN sequence in the receiver PN signal 180 (the receiver PN phase) is controlled by a symbol and PN timing recovery block 208, shown in FIG. 2 and further described below, to match the phase of the received PN sequence in the wideband received signal 159 (the received PN phase). That is, during the synchronization procedure of the communications link initialization, the periodic receiver PN signal 180 is repetitively delayed by a fixed phase increment so that the phase of at least one of the time-shifted receiver PN sequences substantially matches the unknown phase of the predetermined PN sequence embedded in the wideband received signal 159, resulting in a correlation peak.

The process of PN timing recovery comprises matching the phase of the receiver PN signal 180 (the receiver PN phase) with the phase of the predetermined PN sequence embedded in the wideband received signal 159 (the received PN phase) by maximizing the correlation of these two PN sequence signals. The PN timing recovery is performed using novel procedures and hardware as described later. When the receiver PN signal 180 is thus aligned with the wideband received signal 159, the despreading mixer 185 performs the inverse function of the spreading mixer 135, and the filtered output 158 of the despreading mixer 185 has substantially the same characteristics as the IF transmit signal 108.

The bandpass filter 186 in FIG. 1c rejects undesirable spectral content resulting from imperfections in the phase alignment of the two PN signals 130 and 180. The filter also removes noise components falling outside the passband of the filter 186. The output of the bandpass filter 186 is the narrowband IF received signal 158. Under ideal conditions, the received signal 158 would be an exact replica of the transmit signal 108 from the remote transmitter. In practice, there may be differences between the two signals due to degradation suffered in the communication channel.

The limiter 175 removes amplitude modulation from the received signal 158 to produce the amplitude-limited IF signal 157 in a fashion well-known in the art. The limited signal 157 is a binary signal with two discrete voltage levels representing the instantaneous polarity of the narrowband IF received signal 158.

Another signal generated by the limiter 175 is the received signal strength indicator (RSSI) signal 215. The RSSI signal 215 is an analog signal proportional to the logarithm of the power of the received signal 158. This power is in turn directly proportional to the correlation of the receiver PN signal 180 with the PN sequence in the wideband received signal 159. The RSSI signal 215 and the limited signal 157 are both provided to the passband DQPSK decoder 156.

FIG. 2: Passband DQPSK Decoder

FIG. 2 is a block diagram of the passband DQPSK decoder, which comprises the symbol and PN timing recovery block 208, a binary downconverter 202, a second-IF carrier recovery loop 162, and a digital passband DQPSK detector 201.

The symbol and PN timing recovery block 208 performs the PN timing recovery procedures detailed later. This block 208 includes the receiver PN clock 181, which governs the receiver PN signal 180. It modifies the phase of the receiver PN signal 180 so as to maximize the RSSI signal 215, thereby aligning the phase of the receiver PN sequence to that of the PN sequence in the wideband received signal 159. Since the repeated sequences in the PN signal 180 have substantially the same duration as the information symbols, the timing recovery block 208 can infer the start of each new received symbol from the PN signal 180. It uses this information to generate a recovered symbol clock 220. The timing recovery block 208 also generates a bit-clock 218 and an EVAL WINDOW signal 219. The bit clock 218 runs at twice the rate of the symbol clock 220, and indicates the timing of the bits in the received data stream 152. The EVAL WINDOW signal 219 is used by a matched filter in the DQPSK detector 201; in each symbol interval of the symbol clock 220 it indicates a central portion of time during which symbol transitions do not occur. A master clock signal 230 provided to the decoder 156 is a high-frequency digital clock signal that clocks digital processing circuitry in the digital circuits 162, 201, 202, and 208 of the decoder 156.

The binary downconverter 202 is a discrete-amplitude, continuous-time circuit that downconverts the limited signal 157 from the first intermediate frequency IF1 to a second-IF received signal 203 at a lower second intermediate frequency F2, preferably 460.7 kHz. The second-IF received signal 203 can be described as a binary signal representing the polarity of a DQPSK-modulated IF carrier at the IF2 frequency.

The carrier recovery loop 162 recovers the frequency of the carrier in the second-IF received signal 203 and produces two signals at the IF2 frequency representing the recovered second-IF carrier 155I and a $\pi/2$ phase-shifted version of the recovered second-IF carrier 155Q.

The digital passband DQPSK detector 201 recovers the data bits from the second-IF received signal 203, given the recovered symbol clock 220, the recovered carrier signals 155I and 155Q, the EVAL WINDOW signal 219, and the bit clock 218. It generates the received data output 152, which matches the transmit data 102 from the remote transceiver, except where reception errors occur.

FIG. 3: Structure of the Data Frames

FIG. 3a illustrates the timing of the transmit signals 108 and 110, and the received signals 158 and 160 in one embodiment of the invention. The transceiver 10 from FIG. 1 is a time-division duplexing (TDD) device; that is, the transceiver 10 switches between alternately receiving and transmitting data, thereby accomplishing bi-directional communications on a single frequency channel. An interval of time in which the transceiver transmits and then receives data is a TDD frame 301.

FIG. 3a shows the active times for the transmit and received signals 108 and 158 in each 4 ms long TDD frame 301. For clarity, label numbers in this and the following figures are the same as in earlier figures for components and signals described previously. After receiving data, the transceiver 10 waits for a first gap interval 302 and then begins transmission of a transmit frame 303. During this time that the transmit signal 108 is active, the received signal 158 is inactive during an off-time 304. The transmit frame 303 is timed to end before the received frame 306 is received. After the transmit frame 303 ends the transceiver 10 prepares to receive a frame. After a second gap interval 305, a received frame 306 arrives, and the received signal 158 is active. During this time the transmit signal 108 is inactive during another off-time 307. The TDD frame repeats, allowing continuing bi-directional use of the channel.

The received frame 306 has substantially the same duration as a transmit frame 303; they each carry 116 QPSK symbols at the 64 kS/sec rate, so the duration of each transmit or received frame 303 or 306 is 1.8125 ms—a little less than one half of the full period of a TDD frame 301. The two interspersed gaps 302 and 305 each have a nominal duration of 0.1875 ms, giving the TDD frame 301 its total duration of 4 ms.

FIG. 3b shows the format of one of the transmit or received frames 303 or 306 in one embodiment of the communications system. Each of these frames is divided into a series of fields, with each field carrying a particular type of data. During transmission, the line coder 106 assembles various data streams into transmit frames 303. These frames include fields for two logical channels: a B channel for communicating voice data and a D channel for packetized control data.

The B fields 314A and 314B carry the B channel, which conveys the desired voice signal data. Each B field 314A or 314B carries 32 QPSK symbols (64 bits) of voice data and 4 symbols of parity information. In one embodiment of the invention, the voice data are encoded as 4-bit ADPCM words, each of which represents a 125 $\mu$s voice sample. Since the two B fields together carry 128 bits of voice data, each transmit or received frame holds 128/4=32 ADPCM words, or 4 ms of voice information. Since this duration is the same as the 4 ms TDD period, enough data are carried in each TDD frame 301 to permit continuous bi-directional communication.

The D channel is carried by the 16-symbol D field 316. The D channel conveys the control data of signals through which system information is communicated between transceivers. An 8-symbol preamble field 312 in each frame 303 or 306 contains no communicated information: its purpose is to provide a reference signal during the settling of phase-lock loops in the receiver. The 16-symbol SYNC field 318 is a predetermined fixed pattern of data that occurs repeatedly in the same portion of the frame. It is used by the receiving transceiver to synchronize its frame timing with that of the transmitting transceiver. The M field 320 is a measure field used to assess the PN synchronization of the receiver.

The M field 320 is used for verification of correct PN synchronization. This field carries no communicated data; instead, it is a pre-determined sequence. During the time that the M field is being read from the data stream, the transceiver de-spreads the wideband received signal 159 with a PN phase that is shifted from its usual value. The expectation is that by deliberately shifting its PN phase, the receiver should measure a degraded RSSI signal 215, since the shift should reduce the correlation between the receiver PN sequence and the received PN sequence. By checking that this shift does indeed result in a reduced RSSI, the receiver confirms that its original PN phase was indeed correct. If, on the contrary, shifting the receiver PN phase causes no change in the RSSI signal, then the receiver has an indication that the its PN phase was not actually synchronized with the received PN phase. Upon determining from the M field measurement that the receiver PN phase may be incorrect, the receiver takes steps to either reconfirm the loss of synchronization, or to restart the acquisition of PN synchronization. The M-field assessment is preferably performed by hardware, that is, by digital logic elements specifically configured to carry out this testing. In other embodiments of the invention, the M-field assessment is performed by software, that is, by a processor (such as a microprocessor or a DSP or an embedded processor) that uses commands from a program to perform the assessment.

FIG. 3c shows the repeated sequence 330 in the PN sequence used in one embodiment of the invention. This sequence 330 has a length of 15 chips, and a duration of one symbol period. This sequence has a good balance property, in that eight of the chips are +1 and seven of the chips are −1. It is a maximal length PN sequence, with the property that its autocorrelation function has a strong peak at zero shift. More precisely, the correlation between the sequence and an unshifted version of itself has a value of 1, and the correlation between the sequence and any other shifted version of itself has a value of −1 divided by the sequence length. Thus, this sequence has a strong correlation property. There are four runs of length 1 in this sequence, two runs of length 2, one run of length 3, and one run of length 4, so this sequence also has a strong run property.

This sequence is repeated in the PN sequence, which modulates the narrowband IF signals 108 and 158 as described earlier. In the wideband transmit signal 109, each symbol in the transmit frames 303 has been multiplied by the PN sequence 330. Similarly, each symbol in the received frames 306 of the wideband received signal 159 has also been multiplied by the PN sequence 330.

FIG. 4: Flowchart of PN Timing Recovery

In order for a transceiver 10 to correctly de-spread the received spread-spectrum signal 159, the receiving unit must have a PN sequence that is synchronized with a PN sequence used by the transmitting unit. At the initialization at the link between two transceivers, one of the transceivers, called the master transceiver, initializes the link between the two communicating transceivers by sending a master signal to the receiving transceiver. This initial signal, called the master signal, contains information that is used by the other transceiver, called the slave transceiver, to settle and lock the slave's timing circuits. Among the timing circuits that need to be synchronized in the receiving transceiver are the timing of the receiver PN signal 180, the recovered symbol clock 220, and the frame timing. The process of PN timing recovery synchronizes the PN sequence of the receiver (in the receiver PN signal 180) to the received PN sequence (in the wideband received signal 159).

Each transceiver has a transmitter PN clock 131 and a receiver PN clock 181. The transmitter PN clock 131 determines the phase of the PN sequence in the transmit PN signal 130, which is used to spread the narrowband transmit signal 108. The receiver PN clock 181 determines the phase of the PN sequence in the receiver PN signal 180, which is used to despread the wideband received signal 159. In a preferred embodiment of the invention, the PN clocks are related to symbol clocks in the transceivers, since the period of the repeated sequence is substantially equal to the symbol period. The receiver PN clock 181 is comprised in the symbol and PN timing recovery block 208.

The timing of the PN sequence used in the master signal is determined by the PN transmit clock 131 in the master transceiver. It is this PN transmit clock that provides a reference for the PN timing of the link in the TDD communication.

The procedure of PN synchronization has two parts. First the slave transceiver receives the master signal and uses it to synchronize its receiver and transmitter PN clocks 181 and 131 with the master received signal. In a second phase of the PN synchronization, the slave transceiver sends a slave signal to the master transceiver. This slave signal contains timing information on the PN clock of the slave transceiver. The master transceiver uses this slave signal to set the receiver PN clock 181 in the master transceiver. After this procedure, the master transceiver's two PN clocks (its transmitter PN clock 131 and its receiver PN clock 181) will be offset in time by a delay that indicates the round-trip communications time of the TDD link. Once both the transmitter PN clocks and the receiver PN clocks in the master and slave transceivers have been set the PN timing is established for the link.

With the PN sequences thus synchronized, the receiver PN phase of each transceiver (in its receiver PN signal 180) matches its received PN phase (in its wideband received signal 159). After the symbol clock 220 and frame timing in both transceivers are synchronized with the symbol and frame timing in their respective received signals 158, bi-directional communication can proceed over the link.

The steps for establishing the PN timing in the communications link are shown in FIG. 4. The master transceiver initiates the link by transmitting the master signal in step 410. This signal, which is encoded with a PN sequence based on the master transceiver's transmitter PN clock 181, is received by the slave transceiver in step 420. In step 430, the slave transceiver synchronizes its transmit and receiver PN clocks 131 and 181 using the PN timing in the received master signal. The slave then transmits a slave signal using its newly-synchronized transmitter PN clock 181 in step 440. The slave signal is received in step 450 by the master transceiver, which proceeds to adjust its receiver PN clock 131 in step 460 using the PN sequence comprised in the slave signal. At the end of this procedure, the slave transceiver has set a receiver PN clock that indicates the timing of the PN sequence in the signals transmitted by the master transceiver, and the master transceiver has set a receiver PN clock that indicates the timing of the PN sequence in the signals transmitted by the slave transceiver. These PN clocks allow the transceivers to despread their respective wideband received signals 159 with the appropriately synchronized receiver PN signals 180. The steps 430 and 460 of using the received master and slave signals to adjust the slave clock and the master clock are performed with novel procedures and hardware as described below.

In one embodiment of the invention, the slave transceiver has a single PN clock that is used as both the transmit and receiver PN clocks 131 and 181.

FIG. 5: States of PN Timing Recovery

FIG. 5 shows a state machine describing the states of PN timing recovery. The master and slave transceivers each perform the PN timing recovery in three states: acquisition 510, fast tracking 520, and slow tracking 530. The procedures in the acquisition 510 and fast tracking 520 states are performed during the broad steps 430 and 460 presented in FIG. 4. The step 430 of adjusting the slave receiver PN clock concludes with the slave transceiver in the slow tracking state 530. Similarly, the step 460 of adjusting the master receiver PN clock concludes with the master transceiver in the slow tracking state 530.

In acquisition, the master or slave transceiver uses its wideband received signal 159 to coarsely adjust the phase of its receiver PN sequence 180. The acquisition mode is entered when the transceiver begins a new link with the remote transceiver, or when PN synchronization in the link is lost and must be regained. Under these conditions, a RE-SYNC or RESET command is issued by a microprocessor in the transceiver, and the transceiver enters the acquisition state 510.

Since in the preferred embodiment of the invention the PN sequence has a duration equal to the duration of each transmitted symbol, the PN phase is determined by the same timing block 208 that generates the symbol clock 220. In the acquisition state 510, the transceiver uses a maximal likelihood (ML) detection technique to gain a tentative estimate of the PN timing in the wideband received signal 159. The ML detection, as would be known to one skilled in the art of spread-spectrum communication, involves sequencing through the various possible receiver PN phases, and measuring the corresponding correlations between the receiver PN sequence and the received PN sequence. In the present invention the RSSI signal 215 is preferably used as a measure of these correlations. Since the PN sequence has a an autocorrelation function peaked at zero shift, the receiver PN phase leading to the maximum RSSI is expected to be the one best matched to the received PN phase, and is used for the initial estimate of the PN timing. The correlation measurements are made according to techniques described later to ensure that at least one complete set of correlation measurements overlap in time with a received frame 306. This initial estimate is measured with a precision of ½ of a PN chip duration and used to set the receiver PN clock 181. After acquisition 510, the transceiver proceeds to the fast tracking state 520, in which it refines the estimated PN timing. With the refined PN timing, the transceiver continues to the slow tracking state 530 in which it carries on bi-directional communications with the remote transceiver. As the communication proceeds, the transceiver continues in the slow tracking state 530 to maintain its synchronization with the remote transceiver.

The fast tracking and slow-tracking states 520 and 530 can be exited by a command from a microprocessor in the transceiver. This command, the RE-SYNC command, allows interruption of the flow in the state machine if the transceiver's software detects a degraded PN timing or otherwise needs to re-establish the PN synchronization. Upon assertion of the RE-SYNC command by software, the transceiver returns to the acquisition state 510.

FIG. 6: Acquisition Flowchart

FIG. 6 is a flowchart of the acquisition state 510. Shown in this figure are two versions of the procedure: a first version 510S used by the slave transceiver, and a second version 510M used by the master transceiver. In the slave transceiver, the acquisition comprises the steps of initializing, in step 610S, the relevant registers, counters, and flags described below, followed by performing a maximal likelihood (ML) detection in step 620S, in which the slave transceiver analyzes a set of candidate PN phases to get a tentative estimate, with a precision of ½ of a PN chip, of the PN timing as described below. With this tentative estimate, the slave transceiver determines the timing, in step 630S, of the received frames by seeking a SYNC pattern—the predetermined pattern of symbols in the SYNC fields 318. Once a SYNC pattern is detected, the slave transceiver uses the timing of the received SYNC field to set its frame timing and proceeds to the fast tracking state 520. A novel feature of the invention is that if the SYNC pattern is not detected within a pre-determined number of frames (preferably two or four), then the slave transceiver automatically restarts the acquisition procedure, returning to step 610S. This feature provides a self-correcting capability to the PN synchronization procedure. If in the acquisition state the transceiver sets an incorrect PN synchronization, then this feature detects the error by determining that the SYNC field is not being read. The assumption that the SYNC field would not be received correctly is predicated upon the understanding that incorrect PN acquisition results in a high probability of bit error. The feature allows correction of the synchronization error by returning the transceiver to the start 610S of the acquisition state, in which it sets a new PN phase.

The detection of a SYNC pattern is a first test that confirms that the initial estimate of the receiver PN phase is adequate to de-spread the symbols in the wideband received signal 159. If this first test is passed, a second test of the PN synchronization is performed by deliberately shifting the PN phase and checking for a degraded RSSI signal 215, as described above in the discussion of the M-field 320 of FIG. 3b. If the M-field test indicates an incorrect receiver PN phase, the acquisition stage is restarted.

The procedure 510M for the acquisition state of the master transceiver is also shown in FIG. 6. The master transceiver does not perform the search for the SYNC pattern in the acquisition state, but it does have initialization and ML detection states 610M and 620M that perform functions analogous to the corresponding states 610S and 620S of the slave transceiver. After gaining a tentative PN synchronization from the ML detection step 620M, the master transceiver proceeds to the fast tracking state 520.

As can be seen by comparing the procedures 510M and 510S, the acquisition procedure 510 is thus simpler in the master transceiver than in the slave transceiver. This simplicity results from the fact that the master transceiver already has an initial estimate of the received frame timing from the master transmit frame timing used in generating the master signal. The master transceiver uses this initial estimate of the frame timing as it proceeds to the fast tracking state 520.

The acquisition procedure used in the present invention has several advantages over prior-art equivalents. First, it solves the problem of PN acquisition in a correlator-type direct sequence spread spectrum receiver operating in a time-division duplex (or multiplex) environment under conditions of initialization of the link, when the transmitter may or may not yet be active. During acquisition, the receiver is attempting to determine whether the transmitter is active, and if so, to synchronize to the PN timing of the transmitter and receive data.

A second advantage concerns the so-called "false-alarm penalty" that is always associated with correlator-type receivers. This penalty is the time, and possibly data, lost due to locking to an incorrect PN phase. The parameter is especially important in a cordless-telephone environment, where many conditions which can cause the link to crash and to require reestablishment. In telephone applications, the time during which the link is down, interrupting audio traffic, may be perceived by the listener and found to be annoying. Minimizing the so-called link reestablishment time is therefore a valuable feature. The ML detection minimizes that penalty at the expense of extra time required to evaluate all candidates given the condition that the transmitter is active. The acquisition stage of the present invention has several features that further extend the use of the ML detection to optimize the overall link-establishment time.

a) The acquisition stage permits immediate recognition of the received frame, should it be present.

b) It allows some number failures to recognize the received SYNC pattern. This allowance accommodates the fact that the coarse PN phase acquisition (with a resolution of only with a precision of ½ of a PN chip) results in a degraded probability of error, and hence in a higher probability of incorrectly detecting the SYNC pattern.

c) The acquisition stage imposes a time limit for recognizing the received SYNC pattern. Since the transmitter may not have been active during a given portion of the acquisition period, the ML detection may have resulted in a receiver PN phase is unrelated to the actual transmitted PN phase. Therefore, instead of waiting indefinitely for a SYNC pattern that cannot be detected with this incorrect receiver PN phase, the system returns to reassess the PN phase in a manner that optimizes total link setup time.

Figure 7:
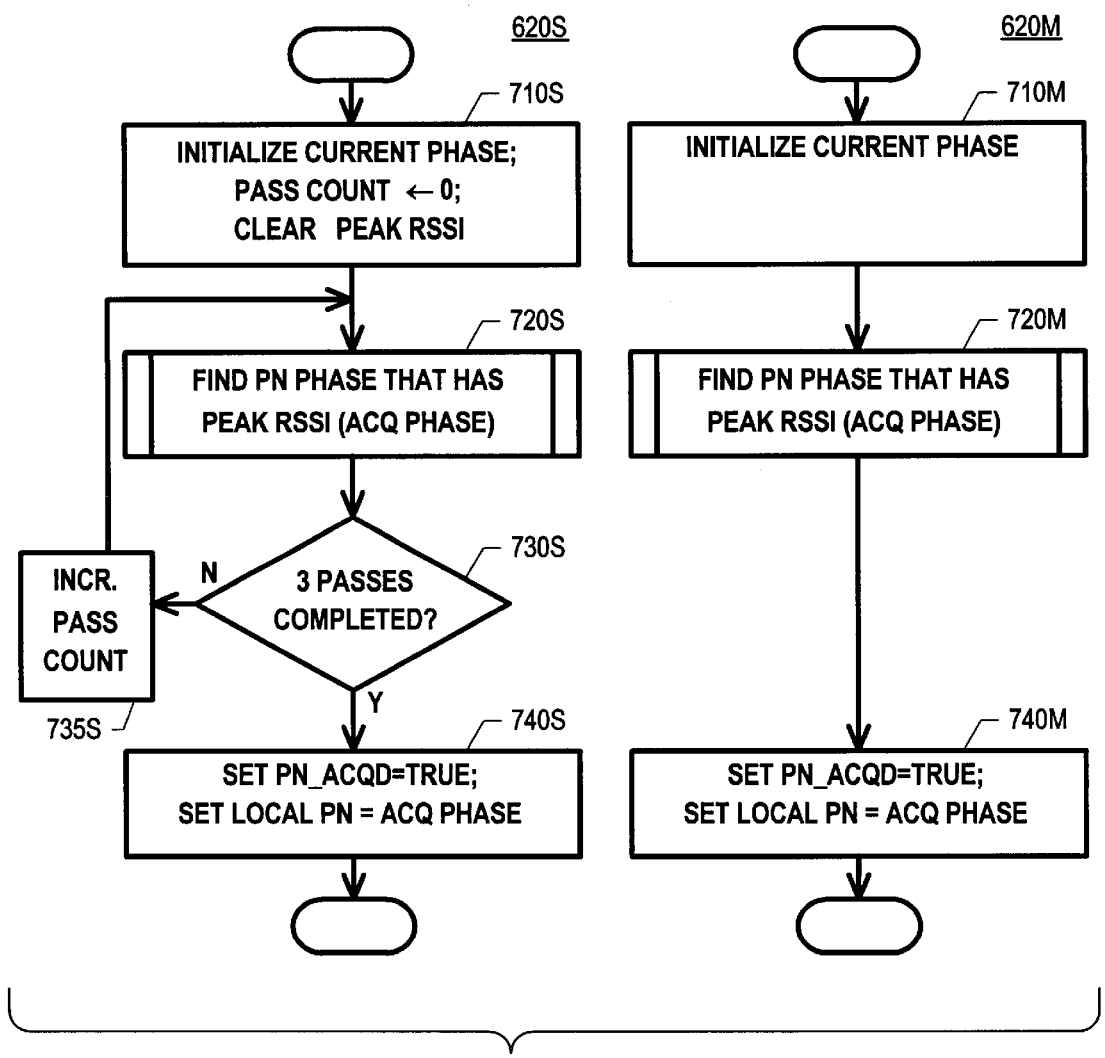
FIG. 7 is a flowchart of the maximum-likelihood detection.

FIGS. 7 and 8: Maximal Likelihood Detection

FIG. 7 shows the procedures for the maximal likelihood detection steps in the acquisition of the PN timing. Shown in this figure are flow diagrams that expand on the steps 620S and 620M from FIG. 6. The procedure 620S for maximal likelihood detection in the slave transceiver starts with step 710S in which the transceiver initializes local registers used in performing the maximal likelihood detection. This initialization comprises choosing an initial phase of the receiver PN clock 181, initializing a counter that indicates the number of passes completed, and clearing a register that indicates the peak value of the RSSI signal 215 measured in the acquisition state.

The slave transceiver then performs three passes of maximal likelihood detection in this state 620S. During each pass the transceiver evaluates the quality of the synchronization of its receiver PN phase with the PN phase received in the wideband received signal 159. In each pass, the transceiver loops through a series of 30 candidate PN phases, as described below. Three complete passes are performed in the maximal likelihood detection procedure for the slave transceiver. Step 720S is the procedure of performing one pass through the 30 candidate PN phases. In this step the slave receiver records a PN phase that results in a peak value of RSSI signal 215. This phase is stored in the register ACQ PHASE. The peak RSSI is an indication of a synchronization between the receiver PN clock and the PN timing comprised in the wideband received signal 159. In step 730S the slave transceiver evaluates the number of passes that have been completed. If three passes have not been completed as indicated by the register PASS COUNT, then the transceiver proceeds to step 735S in which the PASS COUNT register is incremented, and then returns to step 720S to search for better RSSI values in the next pass. If in step 730S the slave transceiver determines that three passes have been completed, then the transceiver proceeds to step 740S in which it sets register PN ACQD to TRUE, and sets the receiver PN clock according to the acquired phase stored in ACQ PHASE. Thus the value of the PN phase stored in the ACQ PHASE register at the end of the maximum likelihood detection is used as an initial value of the receiver PN phase.

The procedure 620M for maximal likelihood detection in the master transceiver is similar to the procedure 620S followed by the slave transceiver. In the master transceiver, however, only one pass of finding the PN phase with the peak RSSI is done. The procedure 620M for maximal likelihood detection in the master transceiver starts with step 710M in which the master transceiver initializes registers as was done for the slave transceiver in step 710S. The master transceiver then proceeds to step 720M in which it performs one pass in finding a PN phase with a peak RSSI. In step 740, the acquired phase is used to set the receiver PN clock, and the PN ACQD register is set to TRUE. After the terminal steps 740S or 740M the slave or master transceiver concludes the ML detection step 620S or 620M.

In FIG. 8 the steps 720S and 720M for finding the acquired phase in the maximal likelihood detection are further described. In this procedure the transceiver steps through the 30 candidate PN phases to find the one that results in a peak RSSI. In this embodiment of the communication system, the PN sequence has a length of 15 PN chips. The goal of the acquisition state is to determine to within one half of a chip duration the correct PN timing for the receiving transceiver. The receiving transceiver therefore has to consider 30 possible candidate PN phases, and determine which of the 30 candidates is most closely matched to the PN phase to the wideband received signal 159. Each pass 720S or 720M starts with a first step 810 in which the transceiver analyses three consecutive information symbols using its current candidate PN phase. The transceiver thus gains information on three samples of the current PN phase. For each symbol the receiver records a value of the RSSI signal 215. The three samples of the RSSI are averaged together and this average is compared in step 820 to a previously recorded peak RSSI. If the current average RSSI is greater than the previously recorded peak, then in step 825 the peak is updated to have the current RSSI average value. Also in step 825, the current candidate phase is recorded as the acquired phase of the wideband received signal 159. After recording these values in step 825 or after having determined in step 820 that the average current RSSI is not greater than the previously recorded peak, the transceiver determines if all 30 candidate PN phases have been evaluated. If some candidate phases have not been evaluated, the transceiver increments the current phase in step 835 and returns to step 810 to evaluate the next PN phase. If in step 830 the transceiver determines that all candidate phases have been sampled, it reaches the end of the procedure 720S or 720M.

FIG. 9: Flowchart for Seeking the SYNC Pattern

The last step in the acquisition state 510 from FIG. 5 for the slave transceiver is the seeking of a SYNC field 318 in step 630S from FIG. 6. This step is further described in FIG. 9. The purpose of seeking a SYNC field is to determine the timing of the received frames in the received signal 158. During this procedure the slave transceiver analyzes the received signal 158 to locate a SYNC field. The slave transceiver performs this analysis for up to a time corresponding to the duration of four received frames. If within this four-frame period the slave transceiver does not detect the SYNC pattern in the received signal 158, it restarts the acquisition state 510 as described below.

The first step in seeking the SYNC field is step 905 in which the slave transceiver initializes its FRAME COUNT register to zero. It then proceeds to step 910 in which it scans one frame for the data pattern of the SYNC field 318, and increments the FRAME COUNT register. In this step, the transceiver also sets a frame timing based on the timing of the SYNC field, if one is detected. The transceiver proceeds to step 920 in which it determines if the SYNC pattern was detected in the previous frame. If the SYNC pattern was detected in the preceding frame period, the transceiver comes to the end of the procedure 630S, and proceeds to the fast tracking state of 520 of the PN timing recovery. If, however, in step 920 the slave transceiver determines that a SYNC pattern was not detected in the previous frame period, then the transceiver determines in step 925 if the FRAME COUNT register is less than four, indicating that the four-frame duration is not yet over. If the FRAME COUNT is less than four, the slave transceiver returns to step 910 to scan the next received frame. If, however, the FRAME COUNT is not less than four in step 925, then the slave transceiver restarts the acquisition state 510. A probable reason for the SYNC field 318 to repeatedly not be detected is that the receiver PN clock 131 is not correctly set. Thus, the ability to return to the acquisition state 510 gives the transceiver a hardware-implemented mechanism for correcting errors in its PN synchronization.

In the embodiment of the invention described in FIG. 9, the slave transceiver assumes an incorrect PN synchronization only after four SYNC patterns are missed. This threshold is chosen to minimize the "false-alarm" penalty of lost data when an incorrect assumption is made about the PN synchronization. Since there is a probability of missing a SYNC pattern even when the receiver PN sequence is well synchronized, the threshold number of misses should be large enough to avoid lost data from false restarts of the acquisition. The threshold should also be small enough that when the synchronization is incorrect, a large amount of data is not lost before the acquisition is restarted. In other embodiments of the invention, this threshold may be a higher or lower number of missed SYNC patterns, as appropriate for the specific implementations.

FIG. 10: Sample Acquisition Waveforms in the Slave Transceiver

FIG. 10 is a graph of sample waveforms during the acquisition state in the slave transceiver. Shown here is an example of a set of waveforms used in one embodiment of the invention to track the process of PN acquisition in the transceiver. The first waveform is the receive-enable waveform. This waveform indicates when the transceiver is in the receive mode. The last waveform, at the bottom of the figure, indicates the state of the PN recovery state machine—acquisition, fast tracking, or slow tracking. As can be seen from these first and last waveforms, the receiver remains in the receive mode throughout the time that it is in the acquisition state. The second waveform in this figure is the PN-acquired waveform. This waveform indicates when the receiver PN clock has been set according to the PN timing in the wideband received signal 159. As shown in the figure, it starts in the low state indicating that the PN timing has not been acquired. The third and fourth waveforms in FIG. 10 are the PASS COUNT and FRAME COUNT registers that indicate, respectively, the number of passes that have been completed in the ML detection and the number of TDD frames that have been scanned in the SYNC pattern search.

These registers start with a value of zero. Waveform 5 indicates the current phase of the receiver PN clock. The next waveform is an example case of the remote transmission power as received by the local receiver. Waveform 7 shows the remote signal strength indicator (RSSI) signal 215. As discussed earlier, this signal depends on the remote transmission power and on the local PN phase used in the receiver PN clock 181. The eighth waveform in this figure indicates the PEAK value of the RSSI signal. Waveform 9 is the ACQ PHASE register, which indicates the PN phase corresponding to the PEAK value. The tenth and eleventh waveforms in this figure are command signals for restarting the acquisition procedure and for indicating that the SYNC pattern has been detected, respectively.

At the start of the acquisition procedure, the slave's receiver is enabled to receive the master signal. The receiver sequences through the thirty candidate phases, numbered 0 through 29 in waveform 5. As discussed earlier, the thirty candidate phases are separated in phase from each other by a ½ of a PN chip duration. The sequencing is repeated three times. At the end of each of the three passes, the PASS COUNT register, in waveform 3, is incremented. The RSSI signal rises and falls along with the remote transmission power of waveform 6, and has spikes, called "correlation flashes," in its value when the receiver PN sequence is synchronized with the received PN sequence in the wideband received signal 159. During the sequencing through the candidate PN phases, the transceiver records the highest RSSI value from waveform 7 in the PEAK register of waveform 8, and the corresponding PN phase in the ACQ PHASE register of waveform 9. When the PASS COUNT register reaches a value of three, the transceiver uses the PN phase in the ACQ PHASE register to set the receiver PN clock in waveform 5. At this time it also sets the PN ACQD indicator of waveform 2 to TRUE, and then starts monitoring the received signal 158 for occurrence of the SYNC pattern.

The reason for performing three passes of the sequencing through the candidate phases is to guarantee that all candidate phase evaluations sample the received signal/local signal correlation at least once while the remote transmitter is active. In view of the unknown TDD ON/OFF timing, performing only one pass could result in the correct phase being evaluated while the remote transceiver is not transmitting. By performing three consecutive passes, at least one of the passes includes an evaluation of the correct phase during an active transmission from the remote transceiver. This technique is innovative and has not been seen in other systems by the inventors. The actual period and duty cycle of transmission, as well as the period of the evaluation, and the number of phases to evaluate must be considered in determining the number of passes to perform and other factors of the ML detection algorithm.

The graph in FIG. 10 shows the case if the SYNC pattern is not received within four TDD frames. After a time period corresponding to the four TDD frames, as indicated by the FRAME COUNT register, the acquisition state restarts itself if the SYNC pattern has not been detected. This restarting can be communicated to other components of the transceiver by the restart signal as shown by waveform 10 in FIG. 10. Upon restart of the acquisition procedure the PN ACQD register is reset to FALSE, the pass and frame counters are reset to zero, and the transceiver again sequences three times through the thirty candidate PN phases. At the end of the three passes of sequencing through the thirty candidate phases, the acquired phase (corresponding to the peak RSSI) is used to set the receiver PN clock and again the transceiver searches for the SYNC pattern in the wide band received signal 159. In this example the SYNC pattern is detected during the next received frame as shown by the SYNC-pattern-detected signal in waveform 11. The detection of the SYNC pattern terminates the acquisition state of the transceiver, whereupon the transceiver proceeds to the fast tracking state, as indicated in the last waveform in the figure. At the termination of this state, the transceiver's receiver PN sequence (governed by the receiver PN clock 181) is synchronized to within ½ of a PN chip duration with the received PN sequence (in the wideband received signal 159).

FIG. 11: Fast Tracking PN Adjustment

After the acquisition phase 510 the transceiver proceeds to the fast tracking state 520, which is further described in FIG. 11. In the fast tracking loop the transceiver temporarily advances and retards, or "dithers", the timing of its receiver PN clock 181 to evaluate the effects of advancing or retarding the timing. If either of these changes in the timing improves the PN synchronization, as measured by the RSSI signal 215, then the transceiver adjusts the receiver PN clock 181 accordingly. It then repeats the dithering to further evaluate the timing.

The first step in fast tracking for the master or slave transceiver is step 1101, in which the transceiver sets a loop counter to zero. The transceiver then waits in step 1105 for the start of the first B field in a received frame, as determined by the frame timing. After detecting the start of a B field in step 1105, the transceiver proceeds to step 1110 in which it advances the receiver PN clock by a small programmable increment $\tau$. In step 1120 the transceiver takes four RSSI samples from four consecutive received symbols and stores the average RSSI value for these samples in a register EARLY AVG. The transceiver then proceeds to step 1130 in which it delays the receiver PN clock by the programmable step $\tau$, which is smaller than a PN chip duration. In the next step 1140, the transceiver takes another set of four RSSI samples and stores the average of these four samples in the register LATE AVG. The transceiver then compares in step 1150 the registers EARLY AVG and LATE AVG. If EARLY AVG has a greater value than LATE AVG the transceiver proceeds to step 1152 in which it advances the receiver PN clock by 65 nanoseconds—roughly $\frac{1}{16}^{th}$ of a PN chip duration. If, however, in step 1150 the register EARLY AVG is not greater than the register LATE AVG, then the transceiver proceeds to step 1154 in which it retards the receiver PN clock by 65 ns. The advance/retard increment of 65 ns is chosen with regard to the particular timing structure of the TDD frames and their components, the precision required of the PN synchronization, the available timing resolution, and other factors. This increment may be larger or smaller in other embodiments of the present invention, depending on variations in these factors.

After advancing or retarding the receiver PN clock in steps 1152 or 1154, the transceiver proceeds to step 1160 in which it evaluates the loop counter to determine if 11 loops through this advance and retard procedure have been completed. If 11 loops have not been completed the transceiver proceeds to step 1165 in which it increments the loop counter and then returns to step 1110 to perform another advance and delay evaluation.

The programmable increment $\tau$ is chosen empirically to optimize performance. The trade-offs between small and large values of $\tau$ are summarized in the following table.

| | small variation in correlation | more error-prone measurement of correlation | inability to track timing. |
|---|---|---|---|
| small τ → | | → | → |
| large τ → | large variation in correlation (good for timing recovery) | → degraded signal and increased probability of error due to poor correlation during evaluation. | |

In each iteration of this loop, the transceiver takes eight RSSI samples from eight consecutive symbols: four with an advanced PN clock, and four with a delayed PN clock. Since the loop is performed eleven times in the fast tracking procedure 520, the procedure's duration is 88 symbol periods. As can be seen in FIG. 3b, the 88 symbols evaluated in this procedure come from the received first B field 314A, the received D field 316, and the received second B field 314B. When the transceiver determines in step 1160 that this advance and retard procedure has been performed 11 times it comes to the termination of the fast tracking state 520 and proceeds to the slow tracking state 530.

Throughout the fast tracking state 520, the transceiver continually monitors software commands from a microprocessor. This continual monitoring is indicated by step 1199, in which the transceiver evaluates if the microprocessor asserts a RE-SYNC command. Upon assertion of the RE-SYNC command by the microprocessor, the transceiver proceeds back to the start of the acquisition state 510. Thus, throughout the fast tracking procedure 520, the controlling microprocessor of the transceiver can restart the acquisition of the PN signal. The criteria for this restart are programmable and can be determined as appropriate for specific implementations.

FIG. 12: Fast-Tracking Waveforms

FIG. 12 shows a sample of the relevant waveforms in the fast tracking state. This figure has an example of the local receiver PN clock phase (of the receiver PN signal 180), the associated registers, and an RSSI level. The first waveform in this figure is the receive-enable signal which takes a high value prior to an anticipated beginning of a received frame. The second waveform shows the start and end of the received frame, along with the various fields in the frame. Waveform 3 in this figure shows the relative phasing of the local receiver PN clock 181 during the fast tracking. This relative phasing is the test dithering of the receiver PN clock, with which the transceiver determines whether to advance or delay the clock. The fourth waveform in this figure shows the corresponding RSSI value as the local receiver PN clock is adjusted. The fifth and sixth indicate the issuance of commands to advance and retard, respectively, the local receiver PN clock 181. Waveform 7 is a graph of the undithered PN phase in the receiver PN clock. The dashed line in this graph indicates the received PN phase in the wideband received signal 159.

As shown in waveform 3, the local PN phasing is alternately advanced and delayed eleven times over the duration of the frame. Each advancing or delaying of the receiver PN clock is by a test phase τ, and lasts for a duration of four symbol periods. As can be seen in the figure, if advancing the clock by the test phase τ results in a greater RSSI level than does delaying the clock, then the transceiver issues an advance-clock command in waveform 4. Otherwise the transceiver issues a retard-clock command in waveform 5. Along with issuing the advance-clock or retard-clock commands, the transceiver advances or retards, respectively, the receiver PN clock 181 by an increment of 65 ns—roughly $1/16^{th}$ of a PN chip duration. Thus in the fast-tracking state, the receiver PN clock is advanced or retarded by up to eleven-sixteenths of a PN chip duration. At the termination of this state, the transceiver's receiver PN sequence (governed by the receiver PN clock 181) is synchronized to within $1/16^{th}$ of a PN chip duration with the received PN sequence (in the wideband received signal 159). (In other embodiments of the invention, the transceiver may advance or retard the receiver PN clock by other time increments, which may represent other fractions of a PN chip duration.

FIGS. 13 and 14: Slow Tracking

FIG. 13 shows a flowchart of the slow tracking procedure 530S in the slave transceiver, and FIG. 14 shows the slow tracking procedure 530M for the master transceiver. For the slave transceiver, the slow tracking procedure 530S starts with the step 1310, in which the slave clears an INTEGRATOR and a SAMPLED_INT register. The slave transceiver then proceeds to step 1315 in which it initializes a FRAME COUNT register to zero. After this initialization the transceiver waits in step 1320 for the start of a D field 316 in the wideband received signal 159. It analyzes 16 symbols from the D field in the next step 1330 and adjusts its receiver PN clock 181 in response to the signal 159. The next step 1340 is for the transceiver to wait for the start of a SYNC field 318. After waiting for the start of a SYNC field in step 1340, the transceiver again analyses 16 symbols in step 1350 and further adjusts the receiver PN clock. The transceiver then waits for a gap interval 302 in step 1360. In the next step 1370 the slave transceiver performs a long-term adjustment during the gap interval 302. The adjustment made in steps 1330, 1350, 1370 are further described below.

After performing the long term adjustment in step 1370, the transceiver evaluates the FRAME COUNT loop register in step 1380. If fewer than 32 frames have been analyzed in the slow tracking state, the transceiver proceeds in step 1385 to increment the FRAME COUNT register, and then returns to step 1320 to wait for the start of a D field 316 in the next received frame. After the transceiver determines in step 1380 that 32 frames have been analyzed it proceeds to step 1390 in which it records one half of the INTEGRATOR register in the SAMPLED_INT register. The function of these registers is discussed below. The transceiver then returns to step 1315 in which the FRAME COUNT register is again cleared and the slow tracking procedure repeats. The slow tracking procedure is performed indefinitely. It is during the slow tracking procedure 530S that the transceiver proceeds with normal bi-directional communication.

As was the case in the fast tracking procedure 520 (described in FIG. 5 and FIG. 11), the slow tracking procedure 530S can be interrupted by a command from the microprocessor. If during the slow tracking procedure 530S, the microprocessor issues a RE-SYNC command, then the transceiver returns to the acquisition state 510, as indicated by step 1399, in FIG. 13.

FIG. 14 describes the procedure for slow tracking 530M in the master transceiver. This procedure is similar to the procedure 530S (from FIG. 13) for slow tracking in the slave transceiver. However, the steps for performing long term adjustments using the INTEGRATOR and SAMPLED_INT registers are not carried out in the master transceiver. Thus the slow tracking procedure 530M in the master comprises steps 1420–1450, which correspond to step 1320–1350 in the slow tracking procedure 530S for the slave. In the first step 1420 for slow tracking in the master transceiver, the transceiver waits for the start of a D field 316. At the start of this D field, the master transceiver proceeds in step 1430 to adjust its PN clock 181 used in the reception of a signal.

This receiver PN clock 181 in the master transceiver has a phase offset from the transmitter PN clock 131 used in the master. This offset is required because the transmission phase of the PN sequence differs in the master transceiver from the reception phase of the PN sequence by the round-trip communication time of the duplex link. After this first adjustment the master transceiver waits in step 1440 for the start of the SYNC field 318 and then performs in step 1450 a further adjustment of its receiver PN clock. The master transceiver then returns to step 1420 to loop indefinitely through the slow tracking procedure 530M while performing communications with the remote transceiver. As in the fast tracking procedures 520 and the slow tracking procedure 530S for the slave transceiver, the master transceiver also can be interrupted by microprocessor commands during the slow tracking 530M. As indicated by step 1499, if the master transceiver's microprocessor asserts a RE-SYNC command during the slow tracking 530M, then the master transceiver returns to the acquisition state 510 to restart the acquisition of a PN timing.

FIG. 15: PN Adjustment in Slow Tracking

The steps 1330, 1350, 1430, and 1450 of adjusting the receiver PN clock 181 are further described in FIG. 15, which is divided into FIG. 15a and FIG. 15b. This figure is a flowchart of the PN adjustments steps 1330, 1350, 1430, and 1450 in the slow tracking states 530S and 530M of the PN timing recovery. In the procedure outlined in FIG. 15a and FIG. 15b, the transceiver takes 16 RSSI samples from 16 consecutive symbols in the wideband received signal 159. It then performs small adjustments on the receiver PN clock if evaluations of the receiver PN signal 180 indicate that the receiver PN clock 181 is consistently lagging or leading the PN timing in the wideband received signal 159. A second purpose of this procedure in the slave transceiver is to record the updates required to maintain the synchronization of the PN timing in the slave. By thus recording the small advances and retardings of the receiver PN phase, the slave transceiver can use the INTEGRATOR register to make long term adjustments to the frequency of the receiver PN clock 181 in the timing recovery block 208. These long term adjustments are second-order corrections to the PN feedback timing, as described later.

As shown in FIG. 15a the first step 1505 of the PN adjustment in the slow tracking phase is to advance the receiver PN clock by the small programmable time τ. With this advanced PN clock the transceiver then takes four samples in step 1510 of the RSSI signal 215 and stores the average of these four samples in the register EARLY AVG. The transceiver then proceeds to step 1515 in which it delays the receiver PN clock by the programmable time τ. With this delayed clock the transceiver takes four more RSSI samples in step 1520 from the next four consecutive received symbols. The average of these delayed samples is stored in the register LATE AVG. In step 1525 the transceiver compares the registers EARLY AVG and LATE AVG and stores the result of the comparison. If the value stored in register EARLY AVG is greater than the value in LATE AVG then the register proceeds to step 1526 in which it stores the value one in a flag E_GT_L. If instead the value in EARLY AVG is not greater than the value stored in the register LATE AVG then the transceiver proceeds to step 1527 in which it stores the value zero in the flag E_GT_L. After storing the result of this comparison in steps 1526 or 1527, the transceiver has completed a first evaluation of the timing of the receiver PN clock.

The transceiver then proceeds to perform an evaluation of the next four consecutive RSSI samples as shown in FIG. 15b. In block 1540 and 1545 of FIG. 15b, the transceiver advances the receiver PN clock by τ and stores the average of four RSSI samples in the EARLY AVG register. The transceiver then delays the receiver PN clock by τ and takes four more RSSI samples that are stored in LATE AVG in steps 1550 and 1555. The registers EARLY AVG and LATE AVG are compared again in step 1560 and 1565. If the result of the first comparison (indicated by the flag E_GT_L) and the result of the second comparison (determined from the registers EARLY AVG and LATE AVG) both indicate that the RSSI values resulting from the advanced receiver PN clock are greater than the values resulting from the delayed receiver PN clock, then the transceiver proceeds to step 1570 in which it advances the receiver PN clock by 65 ns. If the result of both comparison indicates that the RSSI values generated by the delayed receiver PN clock are greater than the RSSI values resulting from the advanced receiver PN clock then the transceiver proceeds to step 1575 in which it retards the receiver PN clock by 65 ns. Thus, in the slow tracking 530M, the PN clock is adjusted only if measurements consistently indicate a lag or lead in the receiver PN phase. If the results of the two comparisons are inconsistent then the transceiver reaches the termination of the PN adjustment as shown at the bottom of FIG. 15b, without adjusting the PN clock. As was the case in the fast tracking procedure, the advance/retard increment of 65 ns is chosen with regard to implementation-dependent factors, and may be larger or smaller in other embodiments of the present invention as warranted by variations in these factors.

If the receiver PN clock is advanced in step 1570, then the slave transceiver records the advancing by incrementing the INTEGRATOR register in step 1580 and then comes to a termination of the PN adjustment procedure. If the slave transceiver retards the receiver PN clock in step 1575, it then decrements the INTEGRATOR register in step 1585 to record the retarding of the clock. The value stored in INTEGRATOR is used in the long-term correction of the PN timing in the slave.

The long-term correction is not performed in the master. Thus, in the master transceiver the INTEGRATOR register is not used and the incrementing and decrementing of INTEGRATOR in steps 1580 and 1585 are not performed. The master thus terminates its PN adjustment procedure after steps 1570 or 1575.

FIGS. 16 and 17: Long-Term PN Adjustments in Slow Tracking

The function of the long-term loop is to measure the difference between the natural frequency of the remote PN clock, which generates the received PN sequence, and the natural frequency of the local PN clock, and to apply control to the local PN clock generator so that the local PN clock frequency and phase match those of the remote, thereby minimizing the phase error over time. Time-varying frequency and phase differences will still exist due to varying radio conditions, but ideally these have zero mean and will be tracked by the directly-proportional part of the timing loop. Additionally, there may exist step functions in the phase error when, for example, a new multipath becomes dominant (i.e. the input received PN sequence experiences a permanent phase shift). In this case, the long-term phase adjustment circuit should cause the local PN clock frequency and phase to converge on the new mean input frequency and phase, again minimizing phase error over time.

The fundamental problem to be solved by the long-term PN adjustment circuit in slow tracking mode is the application of very fine frequency control on the PN clock. The time-resolution of any digital circuitry is limited by the maximum clock rate. In this case the maximum clock rate is 15.36 MHz, with a period of approximately 65 ns, meaning that the best resolution in time available for the circuit is 65 ns. If a 65 ns adjustment is made to the local PN clock each 4 ms frame, the finest resolution (averaged over all time) possible is 65 ns/4 ms=16 ppm. Empirically, it has been found that a desired resolution is nearer 1.0 ppm, so that the circuit can continue to track the remote clock phase to within ±½ chip without additional input information for some time T, where T is described by:

$$(0.5\ \text{Tchip})/T = 1\text{ppm} = 10^{-6} T = 0.5 \times 10^6 \times \text{Tchip}$$

Here, Tchip is the duration of 1 chip, or approximately 1.0 $\mu$s in a preferred embodiment of the present invention, so T is approximately 0.5 seconds.

In order to get this fine resolution, a single 65 ns adjustment may be distributed over a number of frames. For example, one 65 ns adjustment in 32 frames corresponds to 65 ns/(32 frames)×(1frame/4 ms)=0.5 ppm. This can be accomplished by asserting a 65 ns delay in only one frame among 32, resulting in an average delay of 0.5 ppm. Likewise, any number of adjustments can be distributed over the 32-frame interval, each contributing 0.5 ppm to the total adjustment. In a preferred embodiment of the present invention, the long-term PN adjustment circuit asserts between zero and forty 65 ns adjustments over a 32-frame (128 ms) interval, thereby limiting the tracking range of the long-term PLL to about +/−20 ppm from its natural frequency with a resolution of 0.5

A mathematical model of the entire timing loop is shown in FIG. 16. The phase detector 1601 has inputs of the received PN sequence and the local (receiver) PN sequence and performs a measurement indicating by an error indicator e(n,m) whether the local (receiver) PN phase $\phi$(n,m) leads or lags the received PN phase $\theta$(n,m), or whether a phase difference cannot be distinguished. The error indicator e(n,m) takes on one of three values: +1, −1, or 0, where +1 indicates that the local PN leads, −1 indicates that the local PN lags, and 0 indicates no decision. In a preferred embodiment, the error indicator is produced 2 times per 4 ms frame, or approximately at a 500 Hz rate.

The arguments e(n,m) indicate error indicator sample index within a multiframe, and the multiframe index, respectively. The multiframe is the averaging period for the long-term PLL. Since there are 2n error indications made per frame in the preferred embodiment and the multiframe is 32 frames in duration, n increments modulo 64 and therefore ranges from 0 to 63. The multiframe index m increments at each multiple of 32 frames.

The error indicator e(n,m) is sampled by the SAMPLE_CLOCK signal, which occurs at the same rate as the generation of e(n,m), and the sampled result is the proportional error, e_p(n,m). The proportional error e_p(n,m) feeds back to the PN generator 1602 to cause it to produce a modification in its output in the direction opposite that indicated by the error indicator e(n,m). For example, if the error indicator indicates that the local PN lags the remote PN, the local PN is advanced in time in the subsequent SAMPLE_CLOCK interval. The gain coefficient −1 in the feedback loop represents this mapping.

All error indicators are accumulated in the integrator 1603, which is implemented as a binary up/down counter.

The frame counter 1604 divides the SAMPLE_CLOCK by 64, or equivalently, divides the frame count by 32. As was shown in step 1390 of FIG. 13, at the end of each 32-frame interval, the frame counter 1604 produces a signal FRAME_COUNT=31 which samples the integrator output scaled by 0.5 into the register SAMPLED_INT. The interpolator 1605 then maps the value of SAMPLED_INT into a serial sequence of adjustments distributed over the next 32-frame interval. That serial sequence is named the integral error term, e_i(n,m). The mapping function of the interpolator 1605 is detailed for the preferred embodiment in FIG. 17. The interpolator mapping function I takes arguments of SAMPLED_INT and FRAME_COUNT. The FRAME_COUNT input is shown in the bottom line of the figure. The horizontal axis is time. The outputs for various instructional values of SAMPLED_INT with positive polarity are shown in the other lines. The interpolator output is shown to take on a value of +1 or 0 at all times, given positive SAMPLED_INT. If the polarity of SAMPLED_INT were negative, then the interpolator outputs would have a polarity inversion, being either −1 or 0 at all times.

The interpolator output is used in step 1370 from FIG. 13 to adjust the local (receiver) PN phase. It can be seen from the figure that the interpolator acts so as to distribute the indicated error evenly over the multiframe. It can also be seen that when the size of the integrated error exceeds 32 the interpolator acts so as to induce two pulses on e_i(n,m) during certain frames. The maximum allowable SAMPLED_INT value in the preferred embodiment is 40, shown in the last line of the figure, and indicating one adjustment during 24 frames and two adjustments during 8 frames.

The integral error term e_i(n,m) in FIG. 16 feeds back in the same way as the proportional error term e_p(n,m), causing the PN clock generator to advance or retard as indicated by the polarity of the scaled integrated error, SAMPLED_INT.

The integrator scaling term of 0.5 acts to make the response stable and overdamped. It can be replaced with any value $\alpha$ between 0 and 1 which results in desirable performance of the tracking loop. $\alpha$=0.5 was chosen for good performance and simple realization in digital hardware.

The mathematical model of operation can be seen from FIG. 16 to be:

$$e(n,m) = \begin{bmatrix} Signum(\phi(n,m) - \theta(n,m)), & \phi(n,m) \neq \theta(n,m) \\ 0, & \phi(n,m) = \theta(n,m) \end{bmatrix}$$

where:
phase of received PN=$\theta$(n,m)
phase of local (receiver) PN=$\phi$(n,m)
n=sample index, modulo 64 (n=0,1, . . . 63)
n/2=frame count
m=multiframe index (m=0,1, . . . )

$$\phi(n,m) = \phi(n-1,m) - \Delta\phi[e(n-1),m) +$$

$$I(\text{SAMPLED\_INT}, \text{FRAME\_COUNT})]$$

$$= \phi(n-1,m) - \Delta\phi\left[e(n-1,m) + \left[\alpha \sum_{k=-\infty}^{M-1} \sum_{j=0}^{63} e(j,k), n/2\right]\right]$$

$$\text{with } \Delta\phi = 65\text{ ns} \times \frac{2\pi}{\text{symbol period}} = \frac{T_{chip}}{16} \times \frac{2\pi}{15 T_{chip}} = \frac{2\pi}{240}$$

Given an input step function in e(n,m) and neglecting truncation effects, it can be seen from the above equation that the error asymptotically approaches zero; i.e. $\phi$(n,m) asymptotically approaches $\theta$(n,m).

As was shown in FIG. 14, the long-term adjustment is not performed in the master transceiver, since its master clock is used as the timing reference. The slow tracking loop for the master transceiver is thus described by the above equation with $\alpha=0$ and n/2 indicating time in units of the TDD frame period (4 ms).

Other embodiments of the invention use different values for the saturation count of the SAMPLED_INT register (which is ±40 in a preferred embodiment), of the advance/retard increment (65 ns in a preferred embodiment), of the period of the long-term adjustment (32 frames in a preferred embodiment), and of the TDD period (4 ms in a preferred embodiment). Other values of these parameters lead to different performance characteristics. For example, a shorter period for the long-term adjustment leads to a faster response time of the receiver PN clock's frequency, but reduces the stability of the receiver to noise in the received PN phase. A larger advance/retard increment provides a greater range of adjustment of the receiver PN clock's frequency, but reduces the precision of the adjustment.

FIG. 18: Frame-Synchronization State Machine

The state machine for the steps of frame synchronization is shown in FIG. 18. This state machine is readily implemented as a frame-synchronization logic using appropriate logic components and circuit elements, as would be known to one skilled in the art of digital electronic design. The transceiver proceeds through the states shown in this figure in parallel with its proceeding through the PN synch state machine states of FIG. 5. The state machine for frame synchronization comprises three states, frame acquisition 1810, frame tracking 1820, and frame lock, 1830. Frame synchronization is acquired by recognition of the field 318 in the received signal 158. The acquisition occurs each time the PN or bit timing is lost, for example upon link initialization or link re-establishment. Frame synchronization is monitored by hardware to validate bit synchronization and frame synchronization during the link. The frame acquisition state 1810 is entered when the transceiver is RESET to start a new link with a remote transceiver. The acquisition state 1810 can also be entered by a RE-SYNC command from the microprocessor.

Upon entering the acquisition state 1810, the transceiver clears a SYNC occurrence counter. In the case of the slave transceiver, all of the received serial data 152 are compared to the data pattern of the SYNC field 318. The detection of a SYNC pattern is done by strong correlation of the received signal to the expected SYNC pattern. In one embodiment of the slave transceiver, a perfect correlation with the expected SYNC pattern is required by the transceiver to indicate detection of the SYNC pattern. In another embodiment, a less than perfect correlation is required: the detection is performed with a FIR correlator that has a predetermined pass-fail criterion (such as 29 correctly matched bits out of the 32-bit length of the SYNC pattern). Upon the first occurrence of a valid SYNC pattern in the data stream 152, the counter is incremented and the received frame timing and associated radio TDD timing are set.

Only during a brief detection period does the master transceiver monitor its received signal for the SYNC pattern. After initiating a link, the master transceiver and expects a response from the slave transceiver. To detect the response, the master transceiver only monitors serial data within a narrow window in time around the expected location of the SYNC pattern. The duration of this detection window (−0/+7 symbols) is chosen to be large enough to allow flexibility in radio design and propagation delay, but short enough to preclude emulation of the SYNC field by neighboring bits. Thus, if the slave transceiver has responded to a frame received from the master, then during the detection window the master receives the SYNC field from the remote transmitter in the slave. If the slave transceiver has not responded to a frame from the master transceiver (for example, if the slave is out of range), then during the detection window the master does not receive a signal from the slave. In either case, the master has a diminished probability of receiving data bits during the detection window, thereby precluding data bits from being falsely interpreted as the SYNC field. Additionally, the short duration of the detection window precludes noise from being falsely interpreted as the SYNC field.

When the SYNC pattern is recognized within the detection window, the counter is incremented and the received frame timing and associated radio TDD timing are set. The state machine then enters the frame tracking state 1820.

Once in the tracking state 1820, the transceiver compares each subsequent SYNC field to the expected SYNC pattern and either increments the counter for matches or row decrements it for mismatches. The counter saturates at a maximum of 3 and at a minimum of 0. In the case of the slave transceiver, when the counter saturates at 3, the state machine enters the frame lock state 1830. If the counter value reaches zero in the tracking state, the transceiver returns to the acquisition state 1810. In the case of the master transceiver, the machine skips the tracking state and enters directly into the frame lock state 1830. In the frame lock state 1830, the transceiver uses the received frame timing to read the received frames 306 in the stream of received data 152.

When the transceiver enters the frame lock state 1830, an interrupt and flag are issued. When the state machine exits lock due to SYNC mismatches (master or slave) or TDD violations (master only), the interrupt is again issued. TDD violations are measured by the master transceiver only by the occurrence of the expected SYNC timing moving beyond a time-limited window, the location of which is set upon initial acquisition and the width of which is fixed to +/−3 bits. The window allows some drift due to fades and range variations.

The receive D channel is operational in the frame tracking and frame lock states 1820 and 1830. The receive B channel is operational only in the frame lock state 1830. In the master, the transmit D and B channels are unaffected by the receiver state. In the slave, however, the transmitter is enabled only in the frame lock state 1830.

The transceiver continues to monitor the frame timing in the locked state. The SYNC detected event counter continues to accumulate recognitions and failures to recognize the SYNC pattern. For every recognition, the counter is incremented, up to a maximum value of 3. For every failure, the counter is decremented, down to a minimum of 0. When the count goes to zero, an interrupt indicator identifying the loss of synchronization is issued to software. Software then responds by resynchronizing the frame timing. The software control of the resynchronization is a valuable feature in the resynchronization decision. Depending on the specific implementation of the communications system, there will be unforseen factors in the decision to either hold on to a link or to abandon it and resynchronize. Implementing this decision step in software provides flexibility of use for different implementations of the frame-synchronization state machine in the transceiver.

It is to be understood that multiple variations, changes and modifications are possible in the aforementioned embodiments of the invention described herein. Although certain illustrative embodiments of the invention have been shown and described here, a wide range of modification, change, and substitution is contemplated in the foregoing disclosure and, in some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

What is claimed is:

1. A method for synchronizing a receiver pseudo noise (PN) sequence of a direct sequence spread spectrum communication receiver with a received PN sequence in a received signal, wherein the received signal is a time-division duplexing (TDD) signal or a time-division multiple-access (TDMA) signal, wherein the received PN sequence has a received PN phase, and wherein the receiver PN sequence has a receiver PN phase, the method comprising:

performing an acquisition of the receiver PN phase, wherein said performing an acquisition comprises:
determining an initial value of the received PN phase, wherein said determining an initial value uses a maximal-likelihood (ML) detection, wherein a sequence of correlation measurements in the ML detection is repeated so that at least one complete sequence of correlation measurements is made during a time when the received signal is active; and
setting the receiver PN phase equal to the initial value of the received PN phase.

2. The method of claim 1, wherein the sequence of correlation measurements is repeated only for a predetermined duration.

3. The method of claim 1, wherein the received signal is a TDD signal and wherein the sequence of correlation measurements is repeated for a duration of time greater than one TDD frame and less than two TDD frames.

4. The method of claim 1, wherein the received signal is a TDD signal and wherein the sequence of correlation measurements is repeated for a duration of time greater than two TDD frames and less than three TDD frames.

5. The method of claim 1, wherein said determining an initial value of the received PN phase comprises determining a receiver PN phase that maximizes a correlation between the receiver PN sequence and the received signal.

6. The method of claim 1, wherein the sequence of correlation measurements comprises evaluations of N equally spaced values of the receiver PN phase, wherein N is greater than or equal to twice a number of PN chips in the receiver PN sequence.

7. The method of claim 1, wherein said determining an initial value of the received PN phase comprises determining a value of the receiver PN phase that maximizes an RSSI signal.

8. In a direct sequence spread spectrum communication receiver, a system for synchronizing a receiver pseudo noise (PN) sequence with a received PN sequence in a received signal, wherein the received signal is a time-division duplexing (TDD) signal or a time-division multiple-access (TDMA) signal, wherein the received PN sequence has a received PN phase, and wherein the receiver PN sequence has a receiver PN phase, the system comprising:

an input for receiving the received signal,
a receiver PN clock that controls the receiver PN phase of the receiver PN sequence; and
a maximal-likelihood (ML) detection logic coupled to said input and to said receiver PN clock, wherein said ML detection logic is configured to make a sequence of correlation measurements between the receiver PN sequence and the received signal, wherein each correlation measurement in the sequence of correlation measurements is performed with a different value of the receiver PN phase, wherein said ML detection logic repeats the sequence of correlation measurements so that at least one complete sequence of correlation measurements is made during a time when the received signal is active, and wherein said ML detection logic determines an initial value of the receiver PN phase in response to the repeated sequence of correlation measurements;

wherein said receiver PN clock sets the receiver PN phase equal to the initial value of the receiver PN phase.

9. The system of claim 8, wherein said ML detection logic repeats the sequence of correlation measurements only for a predetermined duration.

10. The system of claim 8, wherein the received signal is a TDD signal and said ML detection logic repeats the sequence of correlation measurements for a duration of time greater than one TDD frame and less than two TDD frames.

11. The system of claim 8, wherein the received signal is a TDD signal and said ML detection logic repeats the sequence of correlation measurements for a duration of time greater than two TDD frames and less than three TDD frames.

12. The system of claim 8, wherein the sequence of correlation measurements comprises evaluations of N equally spaced values of the receiver PN phase, wherein N is greater than or equal to twice a number of PN chips in the receiver PN sequence.

13. The system of claim 8, further comprising:
a despreading mixer coupled to said input and to said receiver PN clock, wherein said despreading mixer generates a despread signal from said received signal in response to said receiver PN phase; and
a received signal strength indicator (RSSI) generator coupled to said despreading mixer and to said ML detection logic, wherein said RSSI generator generates an RSSI signal that indicates the strength of the despread signal;

wherein said ML detection logic determines an initial value of the receiver PN phase that maximizes the RSSI signal.

14. A method for synchronizing a receiver pseudo noise (PN) sequence of a direct sequence spread spectrum communication receiver with a received PN sequence in a received signal, wherein the received signal is a time-division duplexing (TDD) signal or a time-division multiple-access (TDMA) signal, wherein the received PN sequence has a received PN phase, and wherein the receiver PN sequence has a receiver PN phase, the method comprising:

performing an acquisition of the receiver PN phase, wherein said performing an acquisition comprises:
determining an initial value of the received PN phase, wherein said determining an initial value uses a maximal-likelihood (ML) detection, wherein only one complete sequence of correlation measurements is performed in the ML detection, and wherein the ML detection is timed so that it is made during times when the received signal is active; and
setting the receiver PN phase equal to the initial value of the received PN phase.

15. The method of claim 14, wherein the received signal is a TDD signal and wherein the sequence of correlation measurements is performed during a receive frame in one TDD frame.

16. The method of claim 14, wherein the received signal is a TDD signal and wherein the sequence of correlation measurements is performed during receive frames in two consecutive TDD frames.

17. The method of claim 14, wherein said determining an initial value of the received PN phase comprises determining a receiver PN phase that maximizes a correlation between the receiver PN sequence and the received signal.

18. The method of claim 14, wherein said determining an initial value of the received PN phase comprises evaluating N equally spaced values of the receiver PN phase, wherein N is greater than or equal to twice a number of PN chips in the receiver PN sequence.

19. The method of claim 14, wherein said determining an initial value of the received PN phase comprises determining a value of the receiver PN phase that maximizes an RSSI signal.

20. In a direct sequence spread spectrum communication receiver, a system for synchronizing a receiver pseudo noise (PN) sequence with a received PN sequence in a received signal, wherein the received signal is a time-division duplexing (TDD) signal or a time-division multiple-access (TDMA) signal, wherein the received PN sequence has a received PN phase, and wherein the receiver PN sequence has a receiver PN phase, the system comprising:

an input for receiving the received signal, a receiver PN clock that controls the receiver PN phase of the receiver PN sequence; and a maximal-likelihood (ML) detection logic coupled to said input and to said receiver PN clock, wherein said ML detection logic is configured to make a sequence of correlation measurements between the receiver PN sequence and the received signal, wherein each correlation measurement in the sequence of correlation measurements is performed with a different value of the receiver PN phase, wherein said ML detection logic performs the sequence of correlation measurements during a time when the received signal is active, and wherein said ML detection logic determines an initial value of the receiver PN phase in response to the sequence of correlation measurements;

wherein said receiver PN clock sets the receiver PN phase equal to the initial value of the receiver PN phase.

21. The system of claim 20, wherein the received signal is a TDD signal and said ML detection logic performs the sequence of correlation measurements during a receive frame in one TDD frame.

22. The system of claim 20, wherein the received signal is a TDD signal and said ML detection logic performs the sequence of correlation measurements during receive frames in two consecutive TDD frame.

23. The system of claim 20, wherein the sequence of correlation measurements comprises evaluations of N equally spaced values of the receiver PN phase, wherein N is greater than or equal to twice a number of PN chips in the receiver PN sequence.

24. The system of claim 20, further comprising:

a despreading mixer coupled to said input and to said receiver PN clock, wherein said despreading mixer generates a despread signal from said received signal in response to said receiver PN phase; and a received signal strength indicator (RSSI) generator coupled to said despreading mixer and to said ML detection logic, wherein said RSSI generator generates an RSSI signal that indicates the strength of the despread signal; wherein said ML detection logic determines an initial value of the receiver PN phase that maximizes the RSSI signal.

* * * * *